United States Patent
Seger et al.

(10) Patent No.: US 8,770,377 B2
(45) Date of Patent: Jul. 8, 2014

(54) BUFFER MEANS FOR CONTAINERS AND METHOD FOR BUFFERING CONTAINERS

(75) Inventors: Martin Seger, Neumarkt i.d. Opf. (DE); Johann Huettner, Mallersdorf-Pfaffenberg (DE)

(73) Assignee: Krones AG, Neutraubling (DE)

( * ) Notice: Subject to any disclaimer, the term of this patent is extended or adjusted under 35 U.S.C. 154(b) by 115 days.

(21) Appl. No.: 13/193,448

(22) Filed: Jul. 28, 2011

(65) Prior Publication Data

US 2012/0024660 A1 Feb. 2, 2012

(30) Foreign Application Priority Data

Jul. 30, 2010 (DE) .......................... 10 2010 036 771
Mar. 24, 2011 (DE) .......................... 10 2011 001 532

(51) Int. Cl.
*B65G 1/00* (2006.01)

(52) U.S. Cl.
CPC ...................................... *B65G 1/00* (2013.01)
USPC .................................... 198/347.4; 198/347.1

(58) Field of Classification Search
CPC .. A24C 5/35; B65G 47/5122; B65G 47/5131; B41J 11/007; B41J 2/155
USPC .......................... 198/347.1, 594; 347/104, 42
See application file for complete search history.

(56) References Cited

U.S. PATENT DOCUMENTS

| | | | |
|---|---|---|---|
| 4,413,724 A * | 11/1983 | Fellner | 198/594 |
| 4,513,858 A | 4/1985 | Fellner et al. | |
| 5,365,721 A * | 11/1994 | Focke | 53/463 |
| 5,685,414 A | 11/1997 | Nerenhausen, Sr. | |
| 6,497,321 B2 | 12/2002 | Horton et al. | |
| 6,712,220 B2 * | 3/2004 | Ruigrok et al. | 209/592 |
| 7,021,452 B2 | 4/2006 | Horton et al. | |
| 7,926,642 B2 | 4/2011 | Huettner et al. | |
| 2003/0209409 A1 | 11/2003 | Horton et al. | |

FOREIGN PATENT DOCUMENTS

| | | |
|---|---|---|
| CA | 2364216 | 6/2003 |
| DE | 202004016069 | 12/2005 |
| DE | 202006000870 | 2/2007 |
| DE | 20221836 U1 | 5/2008 |
| EP | 1849725 | 10/2007 |
| EP | 2010442 | 1/2009 |
| FR | 2745804 A1 | 9/1997 |
| FR | 2907107 B1 | 4/2008 |
| FR | 2953502 A1 | 6/2011 |
| WO | 2011012802 A1 | 2/2011 |

* cited by examiner

*Primary Examiner* — Gene Crawford
*Assistant Examiner* — Lester Rushin
(74) *Attorney, Agent, or Firm* — Simpson & Simpson, PLLC

(57) ABSTRACT

A buffer means (1) and a method for buffering containers (2), in particular in a container handling apparatus, like for example bottles in a bottle filling apparatus, is described. The buffer means (1) comprises at least a first conveyor track (31). Furthermore at least a second conveyor track (32) is provided, which is drivable along a second transport direction (TR2). The first conveyor track (31) and the second conveyor track (32) are parallel to each other and form a buffer module (30). A transfer device (36) transfers the containers (2) from an infeed conveyor track (31E) onto an outlet conveyor track (32A) of the buffer module (30). By means of a sliding device the required buffer capacity of the buffer means (1) can be set. Between the infeed conveyor track (31E) and the outlet conveyor track (32A) of a buffer module (30) at least two further drivable transfer conveyors (31, 32) are provided. Thus a closed surface of the buffer module (30) is created.

37 Claims, 23 Drawing Sheets

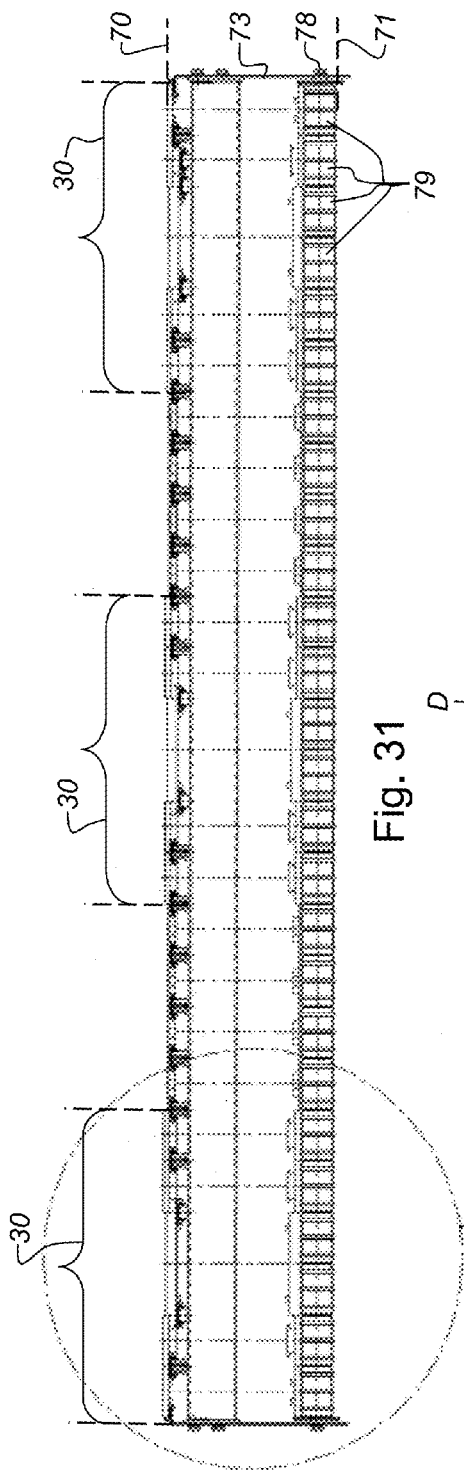
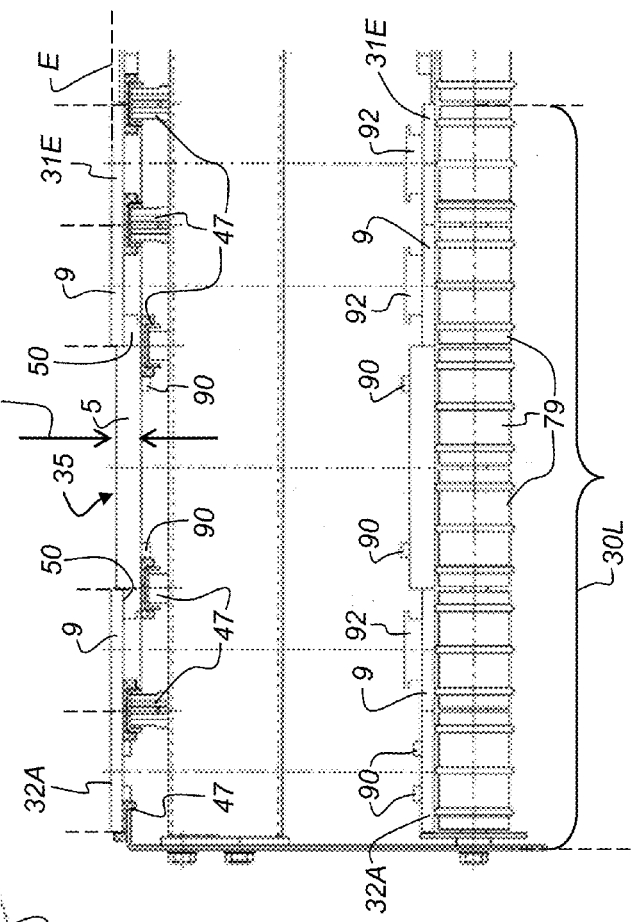
Fig. 31
Fig. 32

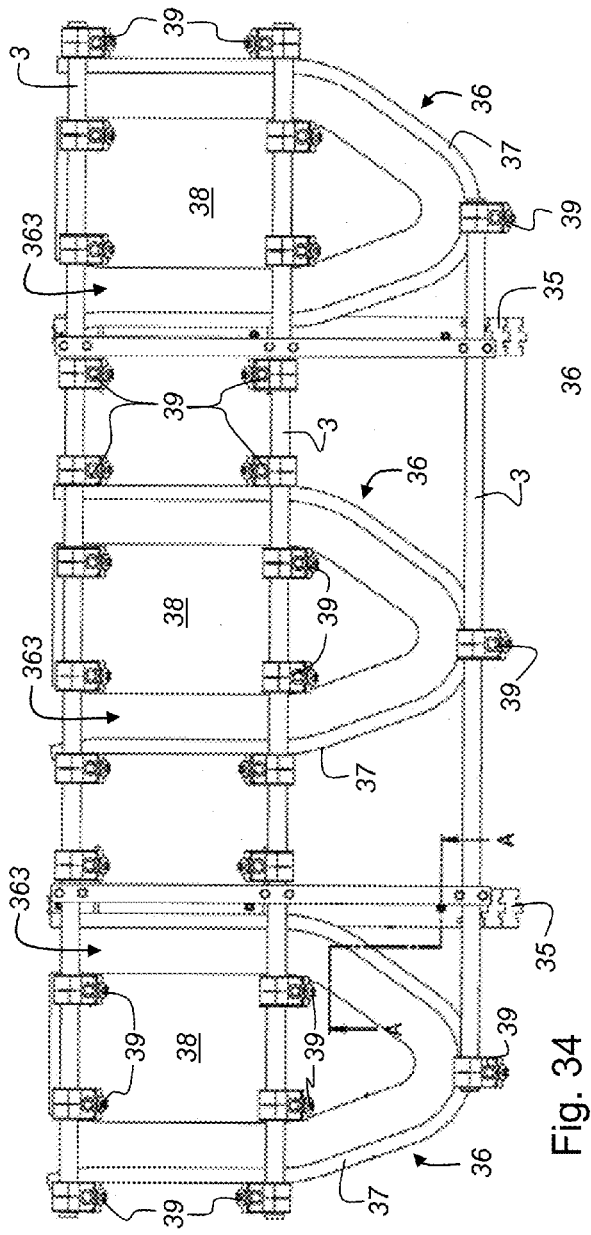
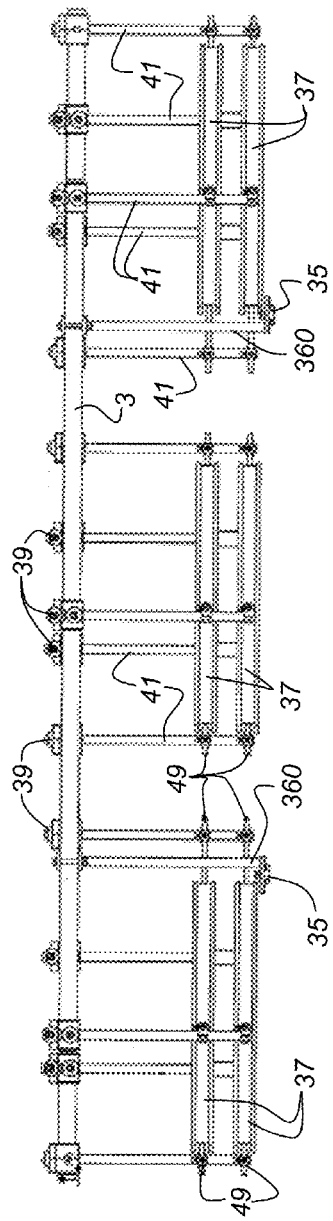
Fig. 34
Fig. 35

BUFFER MEANS FOR CONTAINERS AND METHOD FOR BUFFERING CONTAINERS

CROSS REFERENCE TO RELATED APPLICATIONS

This patent application claims the benefit of German Patent Application No. 10 2010 036 771.0, filed on Jul. 30, 2010 and German Patent Application No. 10 2011 001 532.9, filed on Mar. 24, 2011, both of which are hereby incorporated by reference.

FIELD OF THE INVENTION

The present invention relates to a buffer means for containers operating according to the first in-first out (FIFO) principle. The containers may be cans or bottles (glass bottles or plastic bottles).

In particular the invention relates to a buffer means for containers, wherein at least one infeed conveyor track is drivable along an infeed direction. The buffer means comprises at least one outlet conveyor track, drivable along an outlet direction. The at least one infeed conveyor track and the at least one outlet conveyor track are arranged parallel to each other and form a buffer module of the buffer means. The buffer module has a width and has the infeed conveyor track formed at a first edge and the outlet conveyor track formed at a second edge. Furthermore, a transfer device is provided, exhibiting at least an outer guide. By means of the outer guide the containers can be transferred from the infeed conveyor track to the outlet conveyor track of the buffer module. By means of the sliding device the transfer device can be displaced in parallel along the infeed conveyor track or the outlet conveyor track, respectively, depending on the required buffer capacity in the buffer means.

Furthermore, the invention relates to a method for buffering containers according to the FIFO principle.

BACKGROUND OF THE INVENTION

A container handling apparatus usually comprises plural container handling units, which are arranged one after the other. Container handling units, for example, may be stretch-blow machines for manufacturing plastic containers (plastic bottles) from preforms. Furthermore, it is possible that the container handling unit is a labeling machine for labeling the containers. A further possibility of the container handling unit is a cleaning unit for cleaning the containers. To this is added a filling unit for filling the containers with a liquid or any other content, respectively. Eventually, a packaging unit for packaging or combining the containers to packs follows. Between the individual container handling units of a container handling apparatus plural transport means are provided. If a fault occurs at one of the container handling units, for example the labeling machine, the containers need to be buffered within the process. Through the buffering it is achieved that the container handling units upstream of the labeling unit can continue their operation, in order to transfer the containers only into the buffer of the transport means for buffering there, before supplying them to the labeling unit. Independently of the occurrence of a fault in a container handling apparatus it is also necessary to feed the containers to the individual container handling units of a container handling apparatus according to the step frequency of processing the containers in the individual container handling units. Therefore, it is necessary that the transport means, (buffer means) provided between the individual container handling units, can vary the buffering capacity depending on the required step frequency of the individual container handling units.

Canadian patent application CA 2 364 216 A1 discloses a transport system for the dynamical buffering of articles. The length of the transport system can be variably set, so that a certain number of containers can be buffered in the transport system. Thereunto a linear transport chain for transporting articles into the transport system and a second linear transport chain for transporting articles out of the transport system are provided. Between the first and the second linear transport chain plural U-shaped transport chains are provided, all of which are driven by one motor and thus are running at equal speeds. The bottom of the 'U' of each of these U-shaped transport chains is arranged at the side of the infeed of the containers into the transport system. The opening of the 'U' of each of these U-shaped transport chains is arranged at the side of the transport system opposite the infeed. The legs of the 'U' of the U-shaped transport chain are arranged parallel to the first and the second linear transport chain. Over the transport chains a transfer trolley is provided, which is displaceable along the transport chains. The transfer trolley exhibits a number of transfer discs equal to the number of U-shaped transport chains in the transport system. The transfer discs are positioned between linear transport segments of the transport chains. When articles reach one of the transfer discs of the transfer trolley from a transport chain, they are transferred to the next transport chain by the transport disc. The transport system is configured in such a way that linear transport segments, arranged parallel to each other, of all transport chains transport articles in opposite directions. Thus, the articles are transported back and forth in the transport system. By displacing the transfer system, moreover, the number of articles in the transport system, and thus the number of articles buffered there, can be set.

In the transport system described in CA 2 364 216 A1 all U-shaped chains have the same velocity. During the transfer of the containers from a transport chain to the transfer discs of the transfer trolley the containers are exposed to the risk of being damaged by collisions. Furthermore, there is the danger of a hand of a user getting between the transport chains during operation of the transport system or during maintenance work.

The company Nercon Eng. & Mfg., Inc., Oshkosh, Wis., USA, in U.S. Pat. No. 5,685,414, has described an endless transport system, in which the containers transported are not exposed to pressure from preceding containers. Furthermore, this company has developed a further transport system called "Flex Flow Accumulator", in which the containers transported are exposed only to little pressure from preceding containers, and which, moreover, similar to the transport system of CA 2 364 216 A1, offers the possibility of buffering containers within the transport system. Therein also the number of containers that can be buffered in the transport system can be varied. Unlike CA 2 364 216 A1 a continuous chain is used for transporting the containers in the Flex Flow Accumulator. In this way it is intended to assure that there is no back pressure from the production line.

In the Flex Flow Accumulator by the company Nercon the containers therefore are on one transport chain during the entire transport. Therefore, on the one hand, all containers in the Flex Flow Accumulator are transported with an equal velocity. On the other hand with this construction the transport chain needs to be dimensioned relatively large, and thus is heavy. As such chains become more expensive with increasing dimensions, and because a heavy chain requires a greater driving force, the Flex Flow Accumulator by the company Nercon is relatively expensive with respect to production costs as well as operational costs.

SUMMARY OF THE INVENTION

It therefore is an object of the invention to provide a buffering means for containers, which is variable, and avoids damaging the transported containers, and overcomes the problems of prior art.

The object is achieved by a buffering means for containers operating according to the first in-first out principle, comprising:
- at least one infeed conveyor track drivable along an infeed direction;
- at least one outlet conveyor track drivable along an outlet direction;
- a buffer module formed by the at least one infeed conveyor track and the at least one outlet conveyor track which are arranged parallel to each other and having a width;
- a first edge, at the infeed conveyor track of the buffer module for the containers;
- a second edge, at the outlet conveyor track for the containers;
- a transfer device with an outer guide, so that the containers are transferrable from the infeed conveyor track to the outlet conveyor track of the buffer module;
- a sliding device for sliding the transfer device in parallel along the infeed conveyor track or the outlet conveyor track, respectively, depending on a required buffer capacity in the buffer means; and
- at least one further drivable transfer conveyor arranged between the infeed conveyor track and the outlet conveyor track of the buffer module in such a way that it is parallel to the buffer module.

A further object of the invention is to provide a method for buffering containers, by which damaging the containers is avoided and which overcomes the problems of prior art.

This object is achieved by a method for buffering containers according to the first in-first out principle, comprising the steps:
- supplying containers from a first container handling unit to an infeed conveyor track of a buffer means;
- transferring the containers by means of a transfer device, which exhibits an inner guide and/or an outer guide, from the infeed conveyor track to an outlet conveyor track of the buffer means, wherein during transfer from the infeed conveyor track to the outlet conveyor track the containers are conducted via at least one further drivable transfer conveyor, which is arranged parallel to and between the infeed conveyor track and the outlet conveyor track essentially along an entire length of the buffer module;
- determining a required buffer capacity by means of a control unit of the container handling apparatus; and,
- moving a sliding device together with the transfer device in parallel along the infeed conveyor track and the outlet conveyor track, respectively, in dependence on the required buffer capacity.

An advantageous embodiment of the buffer means for containers operating according to the first in-first out principle, comprises:
- at least one infeed conveyor track drivable along an infeed direction;
- at least one outlet conveyor track drivable along an outlet direction;
- three buffer modules, which are arranged parallel to each other, wherein each buffer module is formed by the at least one infeed conveyor track and the at least one outlet conveyor track which are arranged parallel to each other and having a width;
- a first edge, at the infeed conveyor track of the buffer module for the containers;
- a second edge, at the outlet conveyor track for the containers;
- a transfer device with an outer guide, so that the containers are transferrable from the infeed conveyor track to the outlet conveyor track of the buffer module;
- a sliding device for sliding the transfer device in parallel along the infeed conveyor track or the outlet conveyor track, respectively, depending on a required buffer capacity in the buffer means;
- at least one further drivable transfer conveyor arranged between the infeed conveyor track and the outlet conveyor track of the buffer module in such a way that it is parallel to the buffer module; and,
- a transfer means is arranged between an initial buffer module and a subsequent intermediate buffer module, a transfer between the intermediate buffer module and a last buffer module, wherein the initial buffer module, the intermediate buffer module and the last buffer module are arranged parallel to each other and the transfer means has an endless chain with an upper redirection and a lower redirection provided at a front module, which is arranged in such a way in the buffer means that the endless chain forms the outlet conveyor track of the initial buffer module and the infeed conveyor track of the intermediate buffer module and that the outlet conveyor track of the intermediate buffer module forms the infeed conveyor track of the last buffer module.

The invention discloses a buffer means for containers, wherein the buffer means operates according to the FIFO principle. Put differently, this means that the container which is supplied to the buffer means first, is again taken from the buffer means first and transferred to a container handling unit. To this end the buffer means has at least a first conveyor track drivable along an infeed transport direction. Furthermore, the means has at least a second conveyor track, drivable along an outlet transport direction. The at least one conveyor track and the at least one second conveyor track are arranged parallel to each other and thus form a buffer module of the buffer means. The buffer module has a width and at a first edge exhibits an infeed conveyor track of the buffer module for the containers. At a second edge of the buffer module an outlet conveyor track for the containers is provided. A transfer device exhibiting an inner guide and an outer guide is configured in such a way that the containers are transferrable from the infeed conveyor track to the outlet conveyor track of the buffer module.

Furthermore, a sliding device is provided, by means of which the transfer device is displaceable in parallel along the infeed conveyor track or the outlet conveyor track, respectively, depending on the required buffer capacity in the buffer means. Between the infeed conveyor track and the outlet conveyor track of the buffer module at least two further conveyor tracks are provided. These at least two further conveyor tracks thus form a closed surface of the buffer module.

The closed surface within the buffer module is a considerable advantage because containers which are transported on the infeed conveyor track or on the outlet conveyor track and topple over for some reason, thus remain within the buffer module. The toppled over containers thus can be removed by a user. As these containers have not been destroyed, they can be used further in the container handling process.

According to an advantageous embodiment of the invention the buffer means has at least two buffer modules, arranged parallel to each other in a plane. Between the individual buffer modules a respective transfer means is provided, so that the containers are transferrable from the outlet conveyor track of an initial buffer module to an infeed conveyor track of a subsequent buffer module. Furthermore, the buffer modules have a sliding device, by means of which the transfer devices of each buffer module can be displaced in parallel along the at least two buffer modules depending on the required buffer capacity in the buffer means.

In the buffer means the at least two buffer modules are arranged at a distance parallel to each other. The distance between the buffer modules is required so that the transfer means can be inserted between neighboring buffer modules.

Between two neighboring parallel buffer modules furthermore a cover is inserted. Due to this cover a closed surface or plane, respectively, is formed also between the individual buffer modules, so that no containers possibly toppling over are destroyed.

According to a particularly advantageous embodiment instead of the cover at least one conveyor track, drivable along an infeed direction, is inserted into the distance between two parallel buffer modules. Thus by means of this discharge conveyor track the toppled over containers can be transported to the end of the buffer means. There the containers can be collected by a user and supplied to the further container handling process. Between two neighboring buffer modules a transfer means may be provided, so that the containers are transferrable from the outlet conveyor track of the initial buffer module to an infeed conveyor track of the subsequent buffer module.

The means according to the invention may be configured in such a way that the buffer means comprises a front module, an end module, and at least one intermediate module. The length of the buffer means thus can be varied according to the wishes of a customer by means of individually insertable intermediate modules. The intermediate modules have a standardized module length.

In a particularly advantageous embodiment the buffer means has three buffer modules, which are arranged parallel to each other and at a distance from each other.

The buffer modules of the buffer means may differ with regard to their configuration.

According to a first embodiment each of the three buffer modules of the buffer means has two first conveyor tracks and two second conveyor tracks. The two first conveyor tracks comprise an infeed conveyor track and an immediately neighboring first transfer conveyor, which extends in parallel along the entire length of the buffer module. The two second conveyor tracks likewise comprise an outlet conveyor track and an immediately neighboring second transfer conveyor, which extends in parallel along the entire length of the buffer module. Thus between the infeed conveyor track and the outlet conveyor track of each buffer module there are provided two transfer conveyors, which either are formed by two sub-chains, respectively, or advantageously by one broad chain. Also, if required, the width of the infeed and outlet conveyor tracks can be increased.

Within the plane formed by the buffer modules at least two sliding devices may be provided. The sliding devices may be endless chains, on which at least one transfer device is supported. The two endless chains may respectively be provided between the initial buffer module and the first cover or discharge conveyor tracks and between the second cover or discharge conveyor tracks and the last buffer module. Due to the arrangement of all conveyor tracks one next to the other a closed surface or plane, respectively, is formed across the entire buffer means.

Each transfer device assigned to a buffer module may exhibit an outer guide and an inner guide. The outer guide and the inner guide form a track for the containers from the infeed conveyor track towards the outlet conveyor track. Each of the transfer devices is mounted on a holding structure in such a way that the transfer device is supported on the sliding device by at least one post. As already mentioned, it is possible to freely and linearly displace the respective transfer devices over the respective buffer modules by means of the sliding device. The transfer means may be provided between the two buffer modules arranged parallel to each other and one after the other. The transfer means comprises an endless chain with an upper redirection and a lower redirection provided on the front module. The upper redirection and the lower redirection are arranged in such a way in the buffer means that the endless chain forms the outlet conveyor track of the initial buffer module and the infeed conveyor track of the subsequent buffer module.

The buffer means is connected with a plurality of drive mechanisms, by which the plural conveyor tracks provided in the buffer means can be driven. A first drive mechanism drives the infeed conveyor track of the initial buffer module. A second drive mechanism drives the first transfer conveyor following the infeed conveyor track of the initial buffer module. A third drive mechanism drives the second transfer conveyor of the initial buffer module. A fourth drive mechanism drives the endless chain which is shared by the initial buffer module and the subsequent buffer module, and which comprises the outlet conveyor track of the initial buffer module and of the infeed conveyor track of the subsequent buffer module, as well as the first transfer conveyor of the subsequent buffer module. Furthermore, the fourth drive mechanism in this embodiment may drive the conveyor tracks provided between the buffer modules instead of a cover for discharging toppled-over containers in the direction of the first transport direction. A fifth drive mechanism drives the sliding device. A sixth drive mechanism drives the endless chain which is shared by the subsequent buffer module and the last buffer module, and which comprises the outlet conveyor track of the subsequent buffer module and of the infeed conveyor track of the last buffer module, as well as the first transfer conveyor of the last buffer module. A seventh drive mechanism drives the second transfer conveyor of the subsequent buffer module. An eighth drive mechanism drives the second transfer conveyor of the last buffer module. The outlet conveyor track of the last buffer module is likewise driven by a separate drive. Advantageously, the outlet conveyor track and the second transfer conveyor of the last buffer module may be driven by a common drive. It is obvious to a person skilled in the art that the arrangement and number of the drive mechanisms depends on the number of conveyor tracks, sliding devices, and further conveyors to be driven.

According to a further embodiment of the buffer modules of the buffer means each buffer module has two first conveyor tracks and a second conveyor track. Thus, a first transfer conveyor is provided between the infeed conveyor track and the outlet conveyor track of each buffer module.

Within the plane formed by the buffer modules at least two sliding devices may be provided, which respectively are endless chains, and on which the at least one transfer device is supported. The two endless chains therein are provided between the initial buffer module and the first cover or the discharge conveyor tracks, as well as between the second cover or discharge conveyor tracks and the last buffer module.

By the arrangement of all the conveyor tracks, which are parallel to each other, one next to the other, a closed surface or plane, respectively, is formed across the entire buffer means.

Each transfer device corresponding to a buffer module may exhibit an outer guide and an inner guide. The outer guide and the inner guide together form a track for containers from the infeed conveyor track to the outlet conveyor track of the respective buffer module. Each of the transfer devices is mounted in such a way on a holding structure that it rests on the sliding device with at least one post. Thus, the respective transfer devices may be displaced freely and linearly over the respective buffer modules. The respective outer guide and the respective inner guide are shaped in such a way in the vicinity of the first transfer conveyors next to the infeed conveyor tracks of the buffer modules that the track runs across the first transfer conveyors. Thus, the containers can be transferred directly onto the outlet conveyor track.

As already stated in the context of the previously described embodiments, the transfer means here also is provided between two buffer modules arranged in parallel and one after the other. The transfer means comprises an endless chain with an upper redirection and a lower redirection provided on the front module. The upper redirection and the lower redirection therein are arranged in such a way in the buffer means that the endless chain forms the outlet conveyor track of the initial buffer module and the infeed conveyor track of a subsequent buffer module.

Here, also, various drive mechanisms correspond to the buffer means, in order to correspondingly drive the individual conveyor tracks of the individual buffer modules. A first drive mechanism drives the infeed conveyor track of the initial buffer module. A second drive mechanism drives the first transfer conveyor following the infeed conveyor track of the initial buffer module. A third drive mechanism drives the endless chain which is shared by the initial buffer module and the subsequent buffer module, and which comprises the outlet conveyor track of the initial buffer module and the infeed conveyor track of the subsequent buffer module, as well as the first transfer conveyor of the subsequent buffer module. Furthermore, in this embodiment the third drive mechanism drives the discharge conveyor tracks provided between the buffer modules instead of a cover. A fourth drive mechanism drives the endless chain which is shared by the subsequent buffer module and the last buffer module, and which comprises the outlet conveyor track of the subsequent buffer module and of the infeed conveyor track of the last buffer module, as well as the transfer conveyor of the last buffer module. A fifth drive mechanism drives the sliding device.

According to a further embodiment of a buffer module for a buffer means the buffer module has a first transport conveyor track, which is an infeed conveyor track, and a second transport conveyor track, which is an outlet conveyor track. Between the infeed conveyor track and the outlet conveyor track of each buffer module a first transfer conveyor and a second transfer conveyor are provided. The first and second transfer conveyors provided between the infeed conveyor track and the outlet conveyor track of each buffer module may be formed by an endless transfer chain.

Within the plane formed by the buffer modules at least one sliding device may be provided, which is configured as a slide, and on which the at least one transfer device rests. A louver band is attached to the slide on either side in the direction of the two transport directions, respectively, which assures on the one hand the function of positioning the sliding device, and on the other hand the closed plane. Furthermore, this louver band additionally serves for discharging containers and in particular for a lateral guidance of the neighboring transfer conveyors. The louver band may be provided centrally in the individual buffer modules, respectively, and is shaped as a loop.

Between the infeed conveyor track and the outlet conveyor track of each buffer module a transfer device is provided. The transfer device has an outer guide and/or an inner guide, which together form a track for the containers from the infeed conveyor track towards the outlet conveyor track. Furthermore, each transfer means encompasses the endless transfer chain, which at the transfer means is deflectable from a first transport direction of the infeed conveyor track to a second transport direction of the outlet conveyor track by means of a first deflection pulley. At a second deflection pulley the endless transfer chain is deflectable from a second transport direction of the outlet conveyor track to a first transport direction of the infeed conveyor track.

The outer guide and/or inner guide of the transfer device may be arranged in such a way that the containers are transferrable from the infeed conveyor track via the endless transfer chain to the outlet conveyor track.

The transfer means is provided between the buffer modules arranged parallel to each other and one after the other. The transfer means also comprises an endless chain with an upper redirection and a lower redirection provided at the front module. The upper and lower redirection therein are arranged in such a way within the buffer means that, for example, the outlet conveyor track of the initial buffer module and the infeed conveyor track of the subsequent buffer module form the endless chain.

For driving the conveyor tracks provided in this embodiment of the buffer module or of the buffer means, respectively, also a plurality of drive mechanisms is provided. A first drive mechanism drives the infeed conveyor track of the initial buffer module. A second drive mechanism drives the endless transfer chain, which follows the infeed conveyor track of the initial buffer module, in the first transport direction, due to the configuration at the end module. Advantageously, it would also be possible to integrate the drive mechanism into the front module. Therein the driving then needs to be done in the second transport direction and the pulling force has to be exerted on the endless transfer chain preceding the outlet conveyor track. A third drive mechanism drives the endless chain which is shared by the initial buffer module and the subsequent buffer module, and which comprises the outlet conveyor track of the initial buffer module and of the infeed conveyor track of the subsequent buffer module. A fourth drive mechanism drives the endless chain which is shared by the subsequent buffer module and the last buffer module, and which comprises the outlet conveyor track of the subsequent buffer module and of the infeed conveyor track of the last. A fifth drive mechanism drives the sliding device. A sixth drive mechanism drives the endless transfer chain which precedes the outlet conveyor track of the subsequent buffer module in a second transport direction. A seventh drive mechanism drives the endless transfer chain which precedes the outlet conveyor track of the last buffer module, in a second transport direction.

The third drive mechanism may also drive at least one conveyor track provided between the initial buffer module and the subsequent buffer module as well as between the subsequent buffer module and the last buffer module. Advantageously the load may be distributed between two drive mechanisms. Therein then the third drive mechanism acts on the discharge conveyor between the initial buffer module and the subsequent buffer module, and the fourth drive mechanism acts on the discharge conveyor between the subsequent and the last buffer module.

According to a further embodiment of the invention a buffer module is shaped as a vertical helix and attached to a carrier. The advantage of this is that with the buffer means described in this embodiment the space required for the set-up can be saved. Buffering the containers thus occurs in the vertical direction, in contrast to the embodiments described previously. The buffer means comprises a front module, an end module and at least one intermediate module. The length of the buffer module may be composed by means of individual intermediate modules of constant module length, curved according to the shape of the helix. The length of the buffer module essentially depends on the demands of the customer.

The buffer module may comprise two first conveyor tracks and two second conveyor tracks, so that between the infeed conveyor track and the outlet conveyor track of each buffer module a first transfer conveyor and a second transfer conveyor are provided. The buffer module may have a sliding device, on which the transfer device is supported.

According to a further embodiment the helix-shaped buffer module has two first conveyor tracks and a second conveyor track. Thus a first transfer conveyor is provided between the infeed conveyor track and the outlet conveyor track of each buffer module.

According to a further embodiment the helix-shaped buffer module exhibits a first conveyor track, which is an infeed conveyor track, and a second conveyor track, which is an outlet conveyor track. Between the infeed conveyor track and the outlet conveyor track of each buffer module there are provided a first transfer conveyor and a second transfer conveyor. The first transfer conveyor and the second transfer conveyor provided between the infeed conveyor track and the outlet conveyor track of the buffer module are configured as an endless transfer chain.

The sliding device may encompass the endless transfer chain, which, at the sliding device, is deflectable from the first transport direction of the infeed conveyor track to a second transport direction of the outlet conveyor track by means of a first deflection pulley. By means of a second deflection pulley the transfer chain may be deflected from a second transport direction of the outlet conveyor track to a first transport direction of the infeed conveyor track.

The outer guide and the inner guide of the transfer device may be arranged in such a way that the containers are transferred from the infeed conveyor track via the endless transfer chain to the outlet conveyor track.

A method for buffering containers according to the FIFO principle is described. Herein the containers may be supplied to an infeed conveyor track of a buffer means from a first container handling unit of a container handling apparatus. By means of a transfer device exhibiting an inner guide and an outer guide the containers are transferred from the infeed conveyor track to an outlet conveyor track of the buffer means. During transfer from the infeed conveyor track to the outlet conveyor track the containers are conducted across further at least two drivable conveyor tracks. The required buffer capacity is set in the method according to the invention by a control unit of the container handling apparatus determining the required capacity for buffering. According to the determined required buffer capacity the sliding device together with the transfer device is displaced along the infeed conveyor track or outlet conveyor track, respectively.

In order to be able to redirect the containers buffered in the buffer means within a closed surface, plural conveyor tracks are driven along with the infeed conveyor track and outlet conveyor track proper, respectively. These conveyor tracks are largely free of load and thus barely exposed to tensions. These conveyor tracks thus simply run along with the infeed conveyor track or outlet conveyor track, respectively, and constitute a safeguard and protection so that none of the containers present in the buffer means or in the buffer module, respectively, fall to the floor and thus are destroyed.

The changes of direction of the outlet conveyor track of an initial buffer module towards the infeed conveyor track of a subsequent buffer module are effected by an interior disc. This interior disc of the loaded outlet conveyor track or infeed conveyor track, respectively, compensates tensions and deflects the point of attack of the force. In this way an intertwining of the tracks of the loaded infeed conveyor track or outlet conveyor track, respectively, is avoided. The further conveyor tracks running along may be deflected by a deflection wheel, as usual.

As already described in the context of the embodiments, the sliding device and thus also the transfer device is positioned by at least one louver band provided in the plane of the buffer means, and thus makes an open configuration without additional superstructures of the buffer means possible. The guiding of the sliding device may also be achieved by lateral guides (for example rails).

BRIEF DESCRIPTION OF THE DRAWINGS

The invention is described in greater detail with the help of embodiments and with reference to the accompanying figures.

FIG. 31 shows a sectional view transverse to the transport direction of a third embodiment of the buffer means according to the invention, wherein the buffer means likewise is composed of three buffer modules;

FIG. 32 shows an enlarged representation of the area marked K31 in FIG. 31;

FIG. 34 shows a top view of the arrangement of the three transfer devices of a first embodiment, which are attached to a common structure;

FIG. 35 shows a view of the transfer devices along the transport direction;

DETAILED DESCRIPTION OF THE INVENTION

Figure 1:
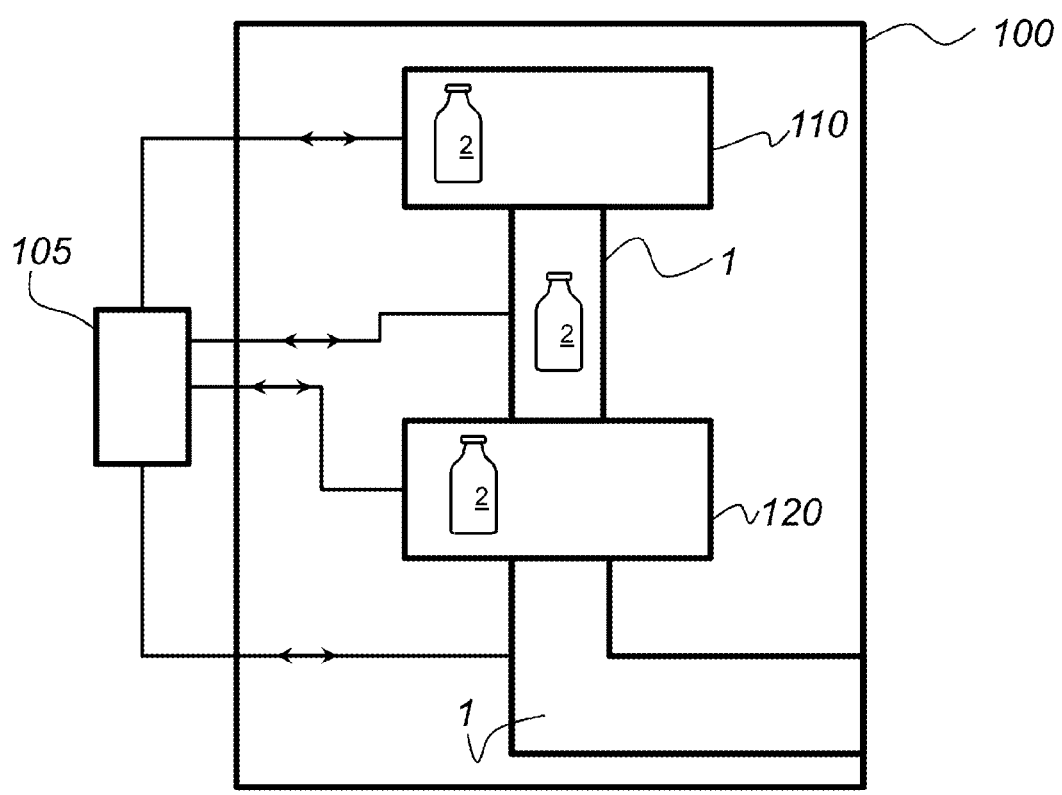
FIG. 1 shows a schematic view of a container handling unit in which the buffer means according to the invention is used.

In the figures the size ratios of individual elements do not always correspond to the real size ratios, as some shapes are shown in a simplified way and other forms are shown enlarged with respect to the other elements for better illustration.

Identical reference numerals are used for like elements of the invention or elements of like function. Furthermore, for the sake of clarity, only those reference numerals are shown in individual figures, which are required for the description of the respective figure. The embodiments shown are only examples of how the means according to the invention may be realised, and do not constitute a final limitation.

FIG. 1 shows, schematically and significantly simplified, a container handling apparatus 100 for handling containers 2, for example, plastic bottles, glass bottles, metal cans, etc. The container handling apparatus 100 in the embodiment shown here comprises a first container handling unit 110 and a second container handling unit 120. Between the first container handling unit 110 and the second container handling unit 120 a buffer means 1 according to the invention is located. Likewise, a further buffer means 1 is arranged downstream from the second container handling unit 120. It is obvious to a person skilled in the art that the container handling apparatus 100 may also comprise more container handling units than the container handling units 110, 120 shown here, and likewise may comprise more buffer means 1.

The first container handling unit 110 may for example be a labeling machine for labeling containers 2 with a label. The second container handling unit 120 for example is a filling unit for filling the containers 2 with a liquid (not shown here). The container handling units 110, 120 may also be a stretch-blow machine for manufacturing plastic containers 2, for example, beverage bottles, from preforms, a cleaning unit for cleaning the containers 2, a packaging unit for packaging the containers 2, etc. The buffer means 1 are for buffering and for transporting the containers 2 from the individual container handling units 110 to downstream container handling units 120 or to further handling units (not shown here), respectively. A control unit 105 is connected with the elements of the container handling apparatus 100. The buffer means 1 are controlled according to the signals measured by the control unit 105, in order to vary the capacity of the individual buffer means 1 in depending on the measurement signals of the control unit 105.

Figure 2:
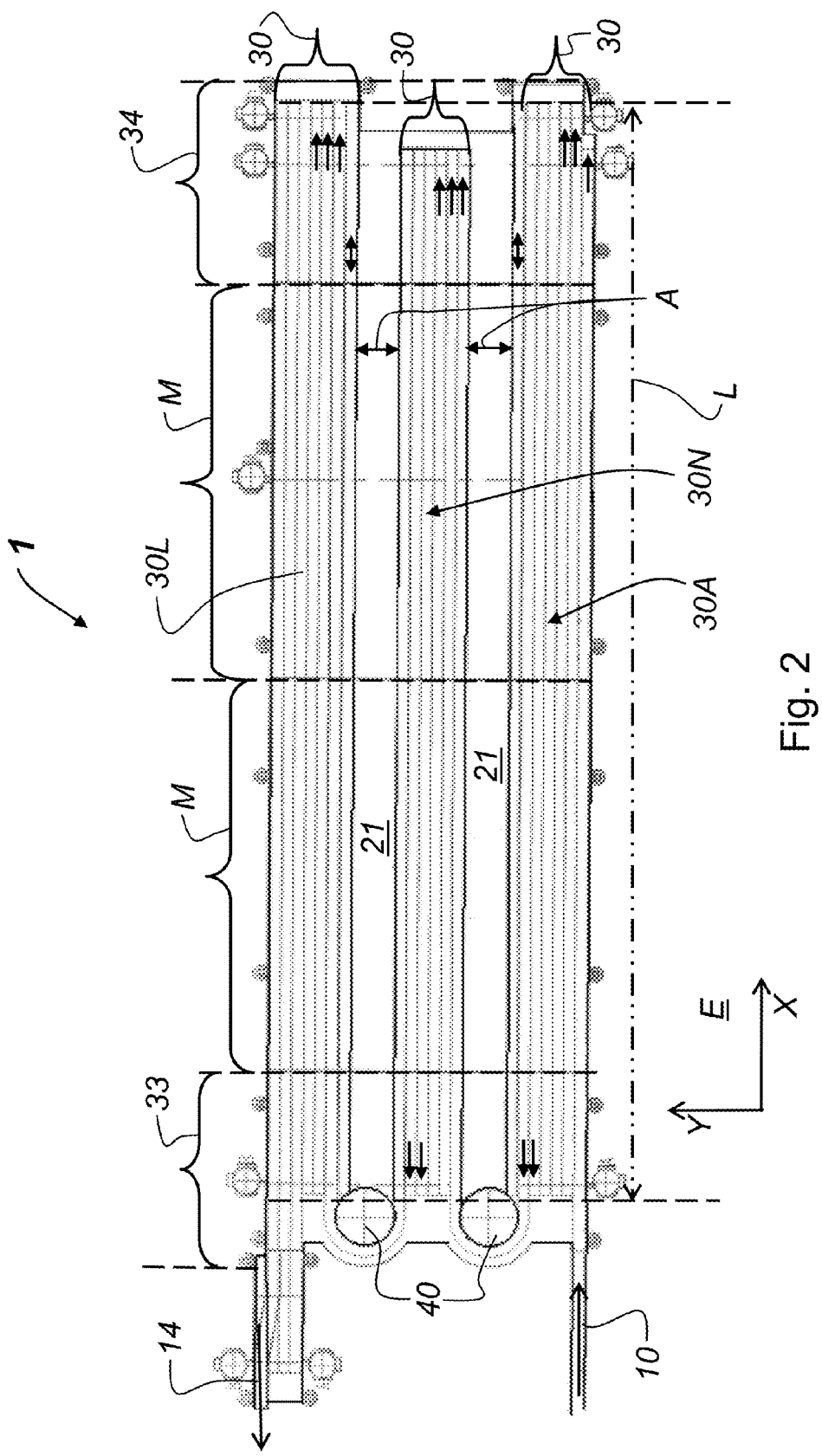
FIG. 2 shows a top view of a first embodiment of the buffer means according to the invention, wherein the infeed into the buffer means and the outlet from the buffer means are also shown.

FIG. 2 shows a top view of a schematic representation of the buffer means 1 according to the invention, which is comprised of three buffer modules 30. The buffer modules 30 of the buffer means 1 are arranged parallel to each other and are situated in a plane E, which in FIG. 2 is represented by the plane spanned in the X-coordinate direction and in the Y-coordinate direction. The buffer means 1 according to the invention has a front module 33 and an end module 34. Between the front module 33 and the end module 34 at least one further intermediate module M is inserted. In the smallest set-up variant the buffer means 1 according to the invention is comprised of a front module 33, an intermediate module M, and an end module 34. The intermediate module M arranged between the front module 33 and the end module 34 therein exhibits a drive mechanism, if only a single intermediate module M is provided. The containers (not shown here) reach the buffer means 1 via an infeed 10. The containers leave the buffer means 1 via an outlet 14. The individual buffer modules 30 are arranged at a distance A from each other. The front module 33 furthermore supports a transfer means 40, by which the containers 2 buffered in the buffer means 1 can be transferred from an initial buffer module 30A to a subsequent buffer module 30N. In this case a cover 21 is provided between the individual buffer modules so that a closed surface or plane is formed. It is obvious to a person skilled in the art that the embodiment shown in FIG. 2 may also comprise more than three and also of fewer than three buffer modules 30.

Figure 3:
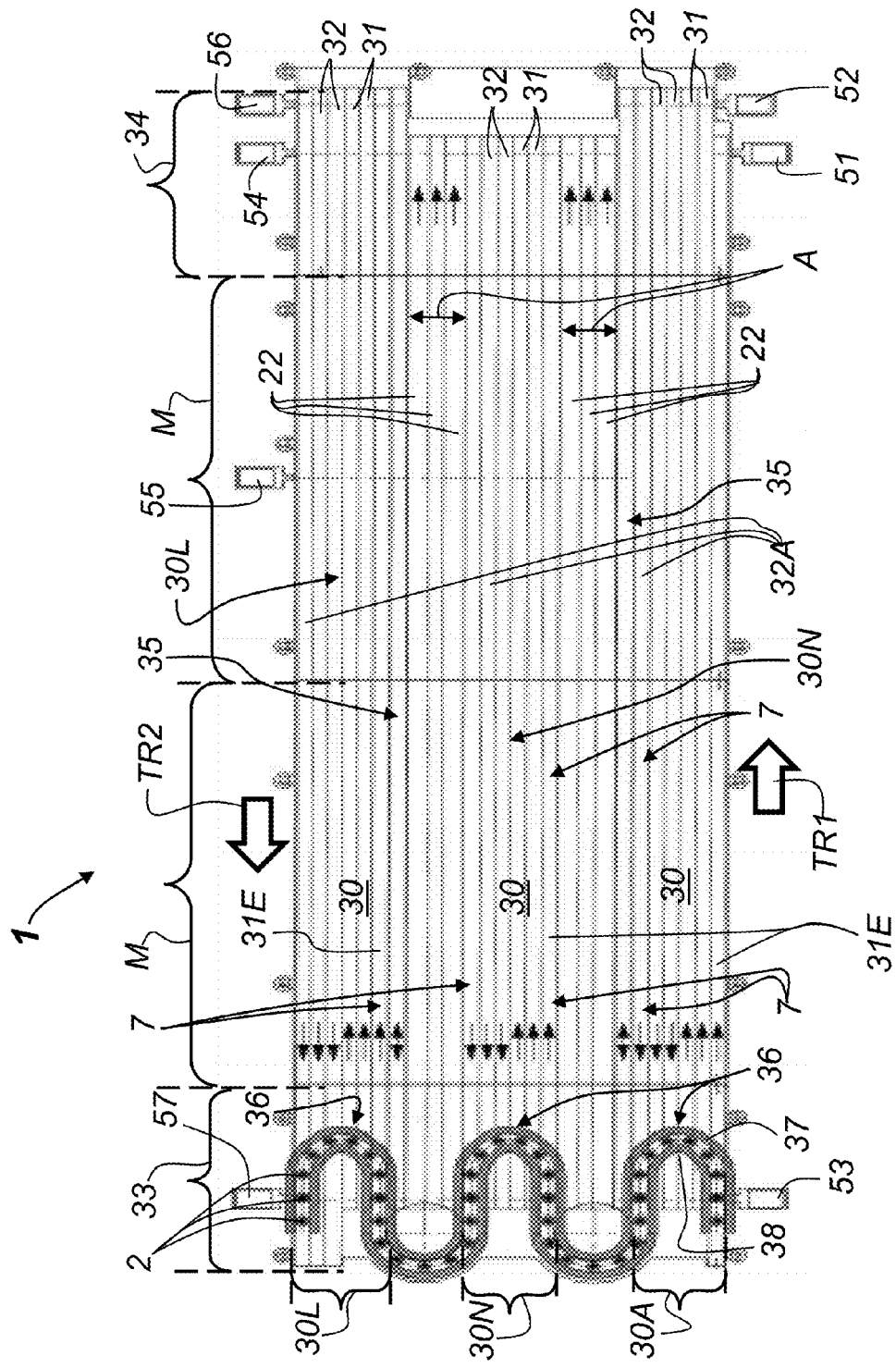
FIG. 3 shows a top view of a first embodiment of the buffer means, wherein the buffer means is formed from three buffer modules, which are arranged parallel to each other and form a closed surface.

FIG. 3 shows a top view of the buffer means 1 according to the invention, which in the first embodiment shown here also is comprised of three buffer modules 30 arranged parallel to each other. The buffer modules are also located at a distance A from each other. The buffer means 1 according to the invention thus has an initial buffer module 30A, a subsequent buffer module 30N, and a last buffer module 30L. To each buffer module 30 there corresponds a transfer device 36. By means of the transfer device 36 the containers 2 can be transferred from an infeed conveyor track 31E of a buffer module 30 via the two transfer conveyors 31 and 32 to an outlet conveyor track 32A of the same buffer module 30. Each transfer device 36 has an outer guide 37 and an inner guide 38. The outer guide 37 and the inner guide 38 are for safely transferring the containers 2 from the infeed conveyor track 31E to the outlet conveyor track 32A of the buffer module 30. The infeed conveyor track 31E and the at least one transfer conveyor 31 of each buffer module 30 are driven in the first transport direction TR1. The outlet conveyor track 32A and the at least one transfer conveyor 32 of each buffer module are driven in the second transport direction TR2.

Into the distance A between the buffer modules 30 a cover 21 (see for example FIG. 9) may be inserted, in order to thus assure a uniform plane E of the buffer means 1. In the embodiment shown in FIG. 3 three conveyor tracks 22 are inserted in the distance A between two neighboring buffer modules 30. The conveyor tracks 22 are drivable in the direction of the first transport direction TR1. Thus, it is possible to transport containers 2, which possibly topple over from a buffer module 30, to the end module 34 of the buffer means 1 by means of the conveyor tracks 22. At the end module 34 the containers 2 arriving in this fashion may be collected easily by a user and may, where applicable, be resupplied to the handling or processing of the containers 2.

For driving the plurality of the first and second transfer conveyors 31, 32, infeed conveyor tracks 31E, outlet conveyor tracks 32A, sliding devices 35, and the conveyor tracks 22 in the buffer means 1, plural drive mechanisms 51, 52, 53, 54, 55, 56, and 57 are provided. A first drive mechanism 51 drives the infeed conveyor track 31E of the initial buffer module 30A. A second drive mechanism 52 drives the first transfer conveyor 31 following the first infeed conveyor track 31E of the initial buffer module 30A. A third drive mechanism 53 drives the second conveyor track 32 of the initial buffer module 30A. A fourth drive mechanism 54 drives the endless chain 7 which is shared by the initial buffer module 30A and the subsequent buffer module 30N, and which comprises the outlet conveyor track 32A of the initial buffer module 30A and of the infeed conveyor track 32E of the subsequent buffer module 30N, and the first transfer conveyor 31 of the subsequent buffer module 30N. Furthermore, the fourth drive mechanism in this embodiment may drive the conveyor tracks 22 provided between the buffer modules, instead of a cover, for discharging toppled over containers 2 in the direction TR1 of the first transport direction. A fifth drive mechanism 55 drives the sliding device 35. A sixth drive mechanism 56 drives the endless chain 7 which is shared by the subsequent buffer module 30N and the last buffer module 30L, and which comprises the outlet conveyor track 32A of the subsequent buffer module 30N and of the infeed conveyor track 31E of the last buffer module 30L, as well as the first transfer conveyor 31 of the last buffer module 30L. A seventh drive mechanism 57 drives the second transfer conveyor 32 of the subsequent buffer module 30N. An eighth drive mechanism (not shown) drives the second transfer conveyor 32 of the last buffer module 30L. The outlet conveyor track 32A of the last buffer module 30L is likewise driven by a separate drive mechanism (not shown). Advantageously the outlet conveyor track 32A and the second transfer conveyor 32 of the last buffer module 30L may be driven by a shared drive mechanism (not shown).

Figure 4:
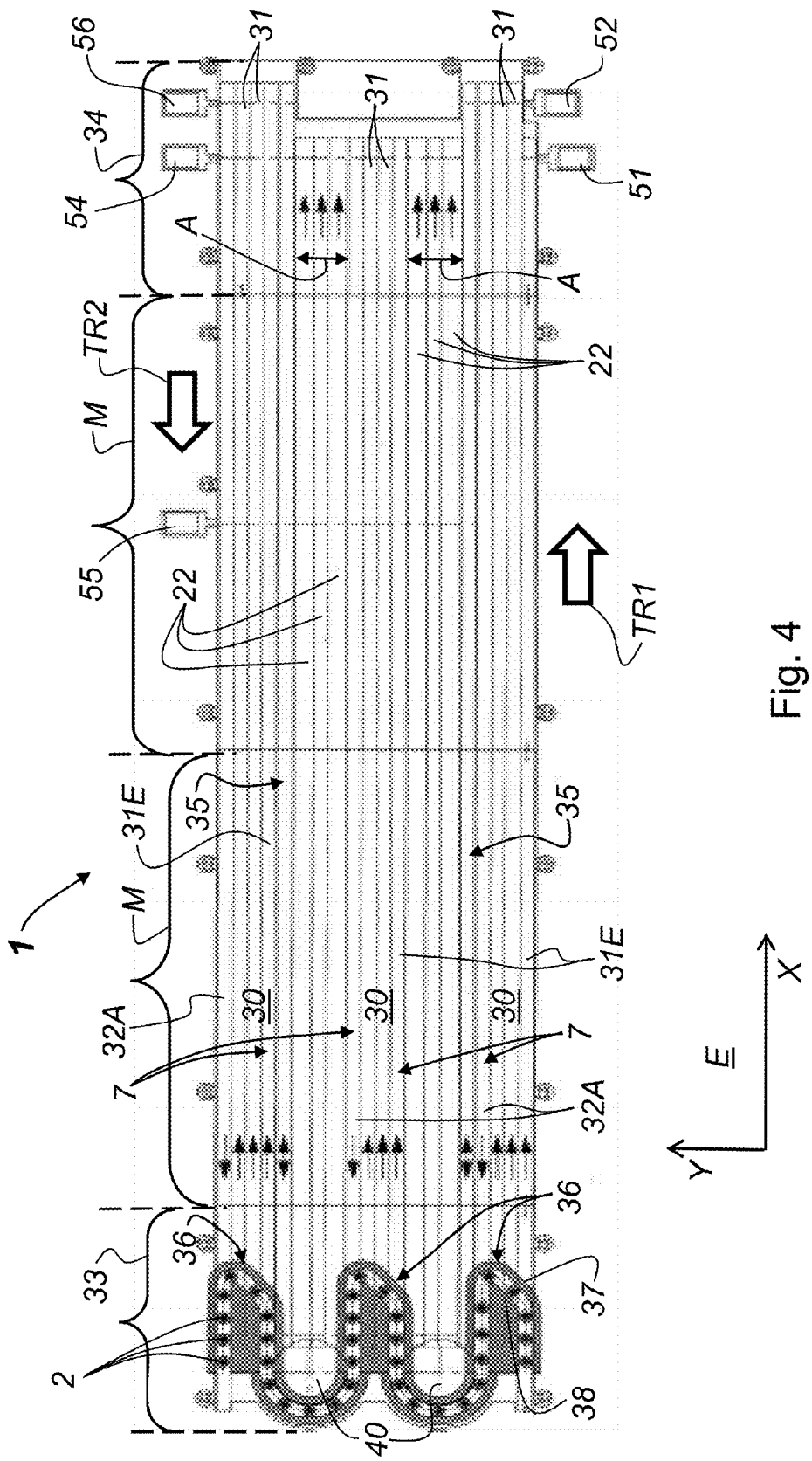
FIG. 4 shows a second embodiment of the buffer means according to the invention, wherein three buffer modules are arranged parallel to each other and form a closed horizontal surface.

FIG. 4 shows a second embodiment of the buffer means 1 according to the invention. As already mentioned in the description of FIG. 3, also in this embodiment three buffer modules 30 are arranged parallel to each other. The buffer means 1 has a front module 33 and an end module 34. Between the front module 33 and the end module 34 two intermediate modules M are inserted in the representation shown in FIG. 4. The intermediate modules M have a uniform module length ML (see FIG. 26). To each buffer module 30 there corresponds a transfer device 36. The containers can be transferred from an infeed conveyor track 31E of a buffer module 30 to an outlet conveyor track 32A of the buffer module 30 by means of the transfer device 36. The transfer device 36 can be displaced in parallel to the buffer modules 30 by a sliding device 35, in order to in this way vary the buffer capacity of the buffer means 1 according to the invention depending on the requirements. The buffer means 1 is likewise comprised of three buffer modules 30, wherein an initial buffer module 30A, a subsequent buffer module 30N, and a last buffer module 30L are provided. The containers 2 entering the buffer means 1 are transferred from the initial buffer module 30A to the subsequent buffer module 30N, and from there to the last buffer module 30L, by means of the respective transfer means 40. The containers 2 leave the last buffer module 30L via an outlet conveyor track 32A assigned to the last buffer module 30L. In analogy to the description of the embodiment shown in FIG. 3 the transfer device 36 is provided with an inner guide 38 and an outer guide 37, in order to, in this way, safely transfer the containers 2 from the infeed conveyor track 31E of a module 30 to the outlet conveyor track 32A of the same module. The individual buffer modules 30 of the buffer means 1 are arranged at a distance A from each other. Into the distance A likewise plural conveyor tracks 22 are inserted. The conveyor tracks 22, together with the initial buffer module 30A, the subsequent buffer module 30N, and the last buffer module 30L, form a plane E. The containers 2 possibly toppling over in a module can be transported to the end module 34 by means of the conveyor tracks 22.

In this embodiment (FIG. 4) also plural drive mechanisms 51, 52, 54, 55, and 56 are provided for driving the plurality of the transfer conveyors 31, infeed conveyor tracks 31E, outlet conveyor tracks 32A, sliding devices 35, and conveyor tracks 22 in the buffer means 1. A first drive mechanism 51 drives the infeed conveyor track 31E of the initial buffer module 30A. A second drive mechanism 52 drives the first transfer conveyor 31 following the infeed conveyor track 31E of the initial buffer module 30A. A third drive mechanism 54 drives the endless chain 7 which is shared by the initial buffer module 30A and the subsequent buffer module 30N, and which comprises the outlet conveyor track 32A of the initial buffer module 30A and of the infeed conveyor track 31E of the subsequent buffer module 30N, and the first transfer conveyor 31 of the subsequent buffer module 30N. Furthermore, the third drive mechanism 54 in this embodiment drives the discharge conveyor tracks 22 provided between the buffer modules 30A, 30N, and 30L instead of a cover 21. A fourth drive mechanism 56 drives the endless chain 7 which is shared by the subsequent buffer module 30N and the last buffer module 30L, and which comprises the outlet conveyor track 32A of the subsequent buffer module 30N and of the infeed conveyor track of the last buffer module 30L, and the transfer conveyor 31 of the last buffer module 30L. A fifth drive mechanism 55 drives the sliding device 35.

Figure 5:
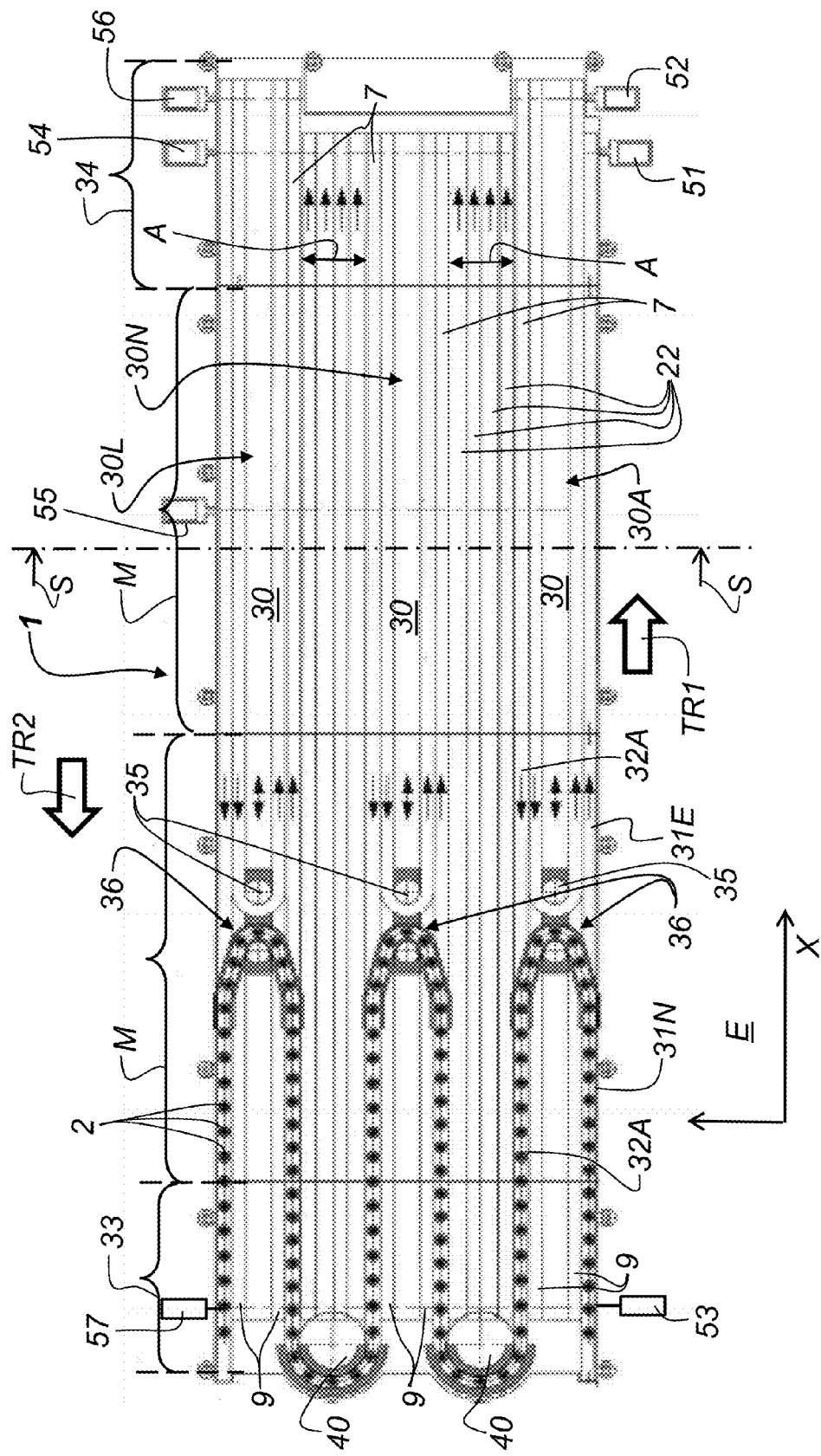
FIG. 5 shows a top view of a third embodiment of the buffer means according to the invention, wherein three buffer modules are arranged parallel to each other and form a closed surface.

FIG. 5 shows a third embodiment of the buffer means 1 according to the invention. The buffer means 1 according to the invention likewise comprises three individual buffer modules 30, which are arranged parallel to each other at a distance A. Likewise plural conveyor tracks 22 are provided in the distance A between the individual buffer modules 30, which, in analogy to the embodiments already described, are used for discharging possibly toppled-over containers 2. To each buffer module 30 there also corresponds a transfer device 36, which transfers the containers 2 from the infeed conveyor track 31E to the outlet conveyor track 32A of each module 30. By means of the arrangement of the three transfer devices 36 the containers 2 can be transferred from the infeed conveyor track 31 of an initial buffer module 30A to an outlet conveyor track 32A of the same buffer module 30A. Between the individual modules 30 there is also provided a transfer means 40 in the front module 33, so that, in cooperation with the corresponding transfer device 36, the containers 2 can be transferred from the infeed conveyor track 31E via the outlet conveyor track 32A of an initial buffer module 30A to an infeed conveyor track 31E of a subsequent buffer module 30N, and onward via the outlet conveyor track 32A of it to an infeed conveyor track 31E of a last buffer module 30L. The infeed conveyor track 31E of each buffer module 30 is drivable in a first transport direction TR1. In analogy to the first transport direction TR1, also the conveyor tracks 22 are drivable, which are provided between the individual modules 30. In the embodiment shown in FIG. 5 a sliding device 35 corresponds to each buffer module 30. A louver band 5 (see FIG. 30) is attached to either side of each sliding device 35, so that the buffer means 1 according to the invention forms a closed plane E and no containers 2 can fall to the floor, and so that the sliding device can be positioned. The transfer devices 36 are supported on the sliding device 35. The sliding devices 35 are arranged centrally in each buffer module 30 of the buffer means 1 according to the invention. The outlet conveyor track 32A of the last buffer module 30L is drivable in a second transport direction TR2, so that the containers 2 can be transported out of the buffer means 1 according to the invention.

In the third embodiment of FIG. 5 plural drive mechanisms 51, 52, 53, 54, 55, 56, and 57 are provided for driving the plurality of infeed conveyor tracks 31E, outlet conveyor tracks 32A, sliding devices 35, endless chain 7, endless transfer chain 9, and conveyor tracks 22. A first drive mechanism 51 drives the infeed conveyor track 31E of the initial buffer module 30A. A second drive mechanism 52 drives the endless transfer chain 9, which follows the infeed conveyor track 31E of the initial buffer module 30A, in the first transport direction TR1. A third drive mechanism 54 drives the endless chain 7 which is shared by the initial buffer module 30A and the subsequent buffer module 30N, and which comprises of the outlet conveyor track 32A of the initial buffer module 30A and of the infeed conveyor track 31E of the subsequent buffer module 30N. A fourth drive mechanism 56 drives the endless chain 7 which is shared by the subsequent buffer module 30N and the last buffer module 30L, and which comprises of the outlet conveyor track 32A of the subsequent buffer module 30N and the infeed conveyor track 31E of the last buffer module 30L. A fifth drive mechanism 55 drives the sliding device 35. A sixth drive mechanism 53 drives the endless transfer chain 9, which precedes the outlet conveyor track 32A of the subsequent buffer module 30N, in a second transport direction TR2. A seventh drive mechanism 57 drives the endless chain 9, which precedes the outlet conveyor track 32A of the last buffer module 30L, in a second transport direction TR2.

The third drive mechanism 54 may also drive at least one conveyor track 22, which is provided between the initial buffer module 30A and the subsequent buffer module 30N, as well as between the subsequent buffer module 30N and the last buffer module 30L.

Figure 5A:
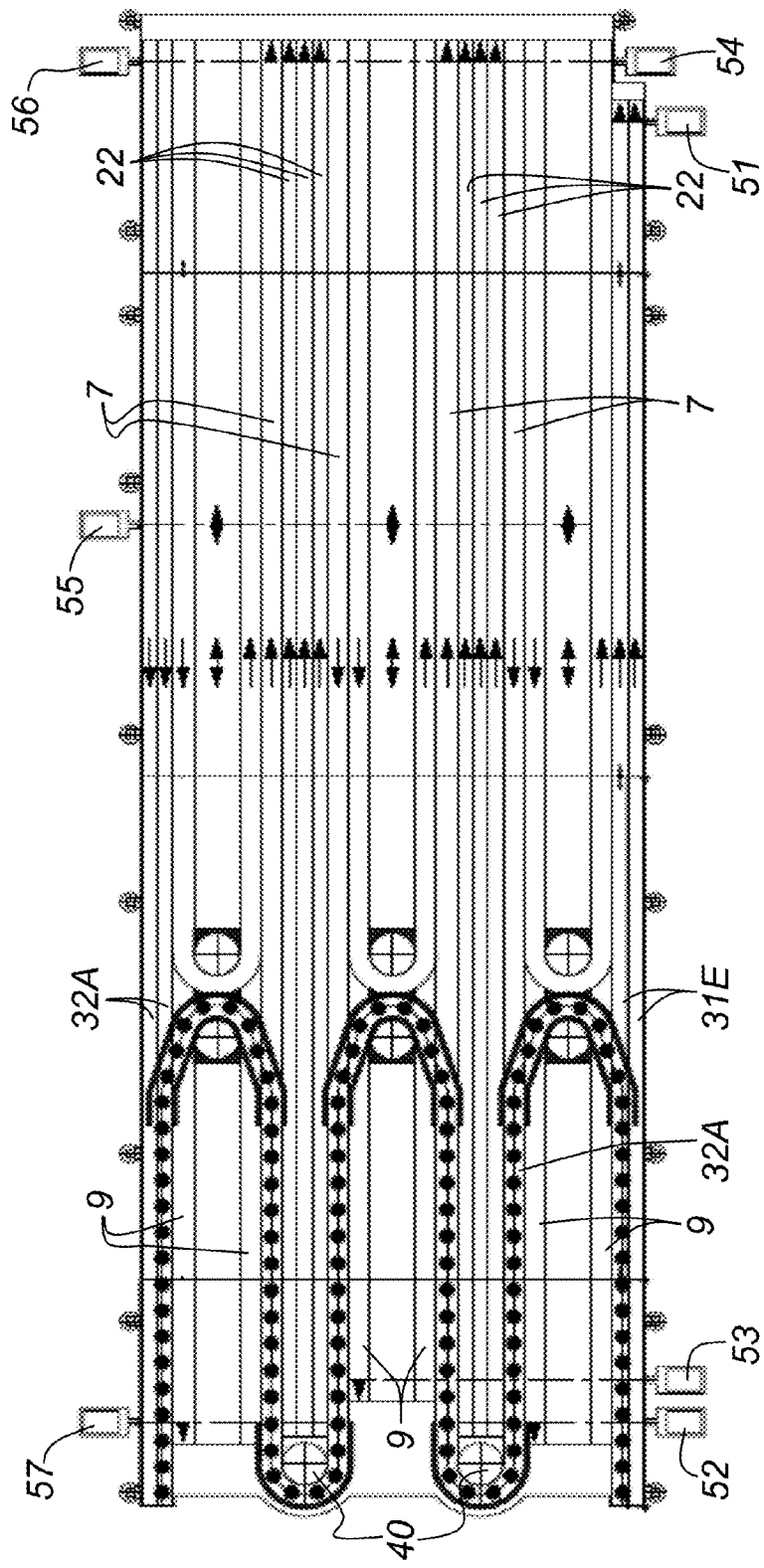
FIG. 5A shows a top view of a further variant of the preferred third embodiment of the buffer means according to the invention, wherein three buffer modules are arranged parallel to each other and form a closed surface.

FIG. 5A shows a variant of the third embodiment of the buffer means 1 according to the invention with a further preferred arrangement of the drive mechanisms. It would advantageously also be possible to integrate the second drive mechanism 52 into the front module 33. The second drive mechanism 52 drives along the second direction of transport and the pulling force needs to be exerted on the endless transfer chain 9 preceding the outlet conveyor track 32A of the initial buffer module 30A. The third drive mechanism 54 drives the endless chain 7 which is shared by the initial buffer module 30A and the subsequent buffer module 30N, and which comprises of the outlet conveyor track 32A of the initial buffer module 30A and of the infeed conveyor track 31E of the subsequent buffer module 30N. The fourth drive mechanism 56 drives the endless chain 7 which is shared by the subsequent buffer module 30N and the last buffer module 30L, and which comprises the outlet conveyor track 32A of the subsequent buffer module 30N and of the infeed conveyor track 31E of the last buffer module 30L. The third drive mechanism 54 may also drive at least one conveyor track 22 provided between the initial buffer module 30A and the subsequent buffer module 30N, and the fourth drive mechanism 56 may also drive at least one conveyor track 22 provided between the subsequent buffer module 30N and the last buffer module 30L. Advantageously here the load of the two conveyor tracks 22 is distributed to two drive mechanisms. Due to the preferred arrangement of the drive mechanisms of the third embodiment the end module 34 does not require offsets in the end region, thus increasing accessibility and contact protection.

In order to be able to handle containers of larger diameters, too, the width of the infeed conveyor track 31E of the initial buffer module 30A and the width of the outlet conveyor track 32A of the last buffer module 30L may be increased, if necessary. Preferentially the infeed conveyor track 31E and the outlet conveyor track 32A are standard chains. The transfer chains 7 and the endless transfer chains 9 are already wider, due to the tension forces.

All further drive mechanisms 51, 53, 55, and 57 keep their function as already described in FIG. 5.

Figure 6:
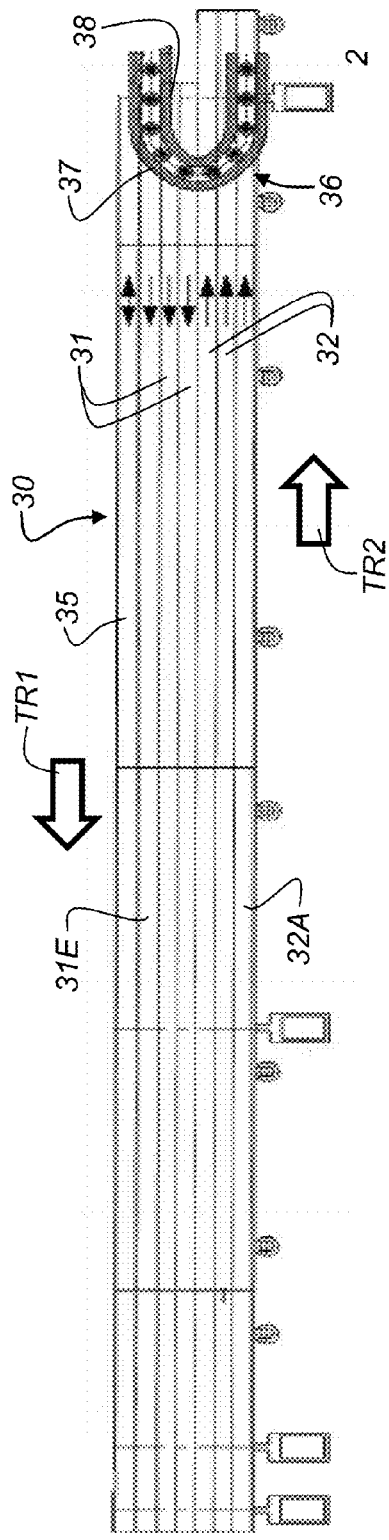
FIG. 6 shows a top view of a first embodiment of a buffer module for the buffer means.

FIG. 6 schematically shows the embodiment of a buffer module 30, as it is used in the embodiment of the buffer means 1 according to the invention described in FIG. 3. The buffer module 30 has an infeed conveyor track 31E and a transfer conveyor 31, which are driven in a first transport direction TR1. An outlet conveyor track 32A and a transfer conveyor 32 are drivable in a second transport direction TR2. Thus, two transfer conveyors 31 and 32 are provided between the infeed conveyor track 31E and the outlet conveyor track 32A. To the buffer module 30 there also corresponds a sliding device 35.

To the buffer module 30 there also corresponds a transfer device 36. The transfer device 36 has an outer guide 37 and an inner guide 38. The containers 2 enter the module 30 along a first transport direction TR1 via the infeed conveyor track 31E. The transfer device 36 transfers the containers 2 from the infeed conveyor track 31E of the module 30 to the outlet conveyor track 32A of the same module 30. The outer guide 37 and the inner guide 38 of the transfer device 36 form a track 363 (see FIGS. 33 and 34), so that the containers 2 may be transferred from the infeed conveyor track 31E via the two transfer conveyors 31 and 32 to the outlet conveyor track 32A.

Figure 7:
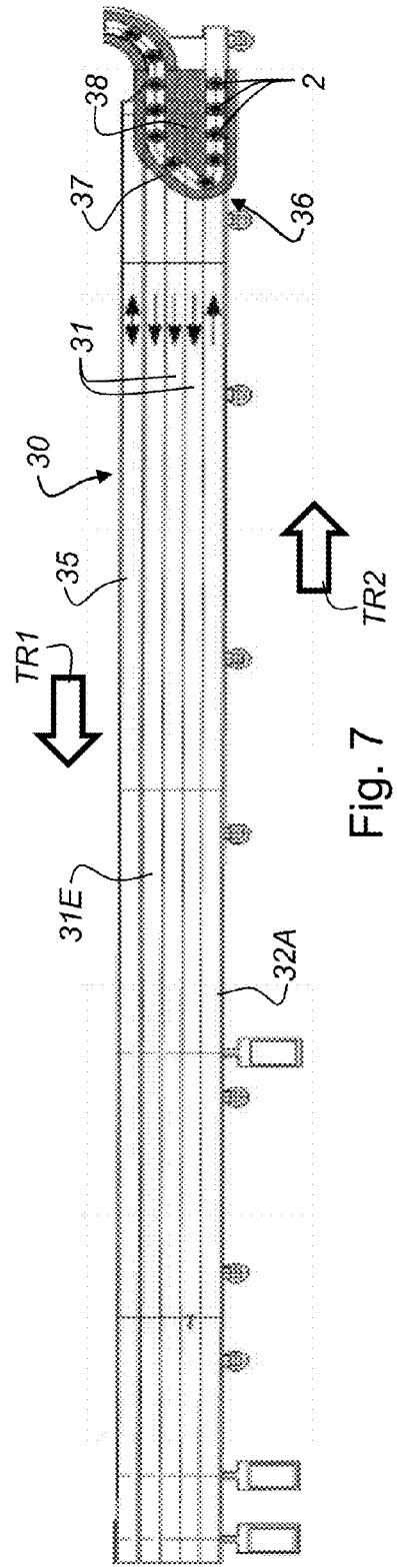
FIG. 7 shows a top view of a second embodiment of the buffer module for the buffer means.

FIG. 7 shows a top view of a further embodiment of the buffer module 30, as it is used in the embodiment of the buffer means 1 according to the invention described in FIG. 4. The buffer module 30 has an infeed conveyor track 31E and a transfer conveyor 31, which are drivable in a first transport direction TR1. An outlet conveyor track 32A is drivable in a second transport direction TR2. The second transfer conveyor 32 also is the outlet conveyor track 32A of the embodiment of the buffer module 30 shown here. Thus, between the infeed conveyor track 31E and the outlet conveyor track 32A at least one further first transfer conveyor 31 is provided. To the buffer module 30 there may also correspond a sliding device 35, by which the transfer device 36 of each buffer module that can be displaced depending on the buffer capacity required. The transfer device 36 for the buffer module 30 of the embodiment shown in FIG. 7 also has an outer guide 37 and an inner guide 38. The outer guide 37 and the inner guide 38 together form a track 363 (see FIGS. 33 and 34) for the containers 2. The outer guide 37 and the inner guide 38 in the vicinity of the infeed conveyor track 31E and of the neighboring first transfer conveyor 31 of the buffer module 30 are shaped in such a way that the track 363 formed runs essentially transversely to the at least one first conveyor track 31. The containers 2 thus immediately reach the outlet conveyor track 32A of the buffer module 30.

Figure 8:
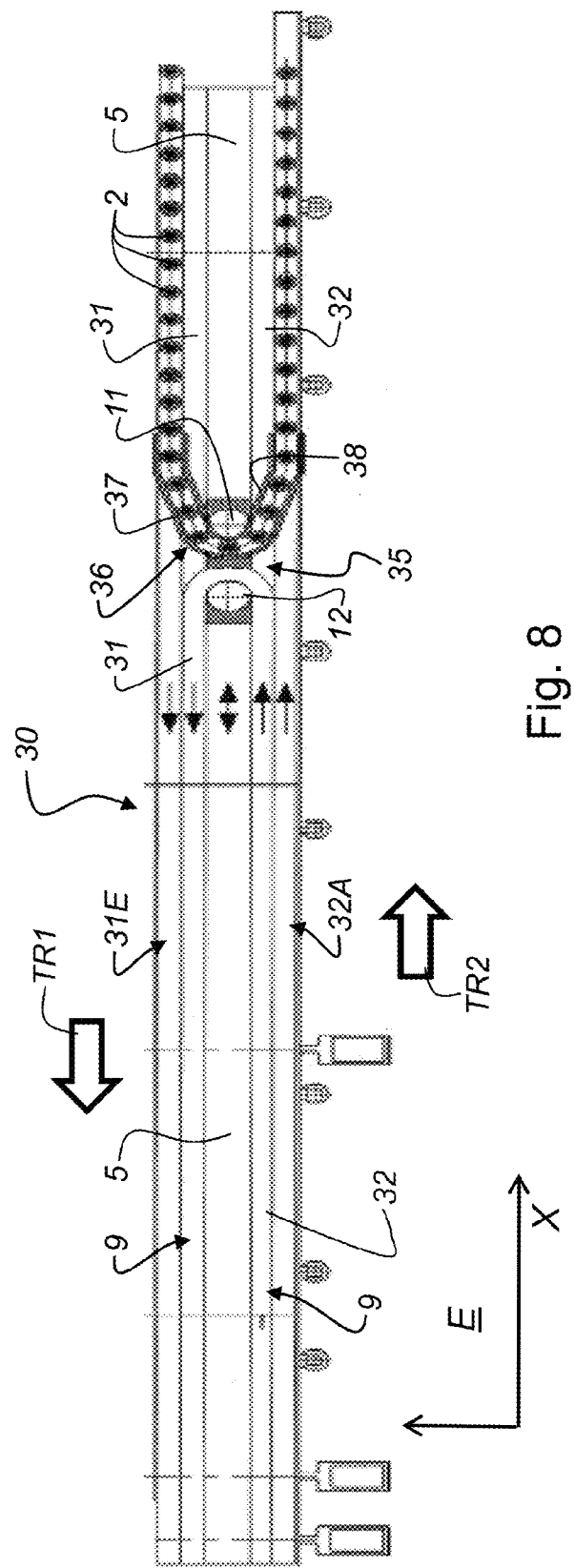
FIG. 8 shows a top view of a third embodiment of the buffer module for the buffer means.

FIG. 8 shows an embodiment of the buffer module 30 as it is used in the embodiment of the buffer means 1 of FIG. 5. The buffer means 30 has an infeed conveyor track 31E which is driven in a first transport direction TR1. Furthermore, the buffer module 30 has a second outlet conveyor track 32A, which is drivable in a second transport direction TR2. Furthermore between the infeed conveyor track 31E and the outlet conveyor track 32A of each buffer module 30 a further first transfer conveyor 31 and a further second transfer conveyor 32 are provided.

The first transfer conveyor 31 and the second transfer conveyor 32 provided between the infeed conveyor track 31E and the outlet conveyor track 32A are configured as an endless transfer chain 9. The sliding device 35 for the transfer device 36 corresponding to each buffer module 30 is arranged centrally in each buffer module 30 in this embodiment. The transfer device 36 is supported on the sliding device 35, which in turn is connected to a louver band 5 on either side. Thus, by the louver band 5 a uniform closed surface or plane E for each buffer module 30 is formed. The respective transfer device 36 transfers the containers 2 from the infeed conveyor track 31E to the outlet conveyor track 32A of the buffer module 30. Each transfer device 36 of the embodiment described in FIG. 8 has the endless transfer chain 9 comprising individual transfer conveyors 31 and 32. The endless transfer chain 9 runs along the first transfer conveyor 31 up to the first deflection pulley 11 in a first transport direction TR1, is deflected horizontally at the deflection pulley 11, and thus arrives in the second transport direction TR2 as transfer conveyor 32. Back at the front module 33 the second transfer conveyor is deflected vertically and runs along a guide below the closed surface or plane E along a first transport direction TR1 up to another vertical deflection at the end module 34. Then, the second transfer conveyor 32 is again above the closed surface or plane E, and again runs along the second transport direction TR2 up to the second horizontal deflection pulley 12. There the second transfer conveyor 32 is deflected again, and thus again becomes the first transfer conveyor 31 along a first transport direction TR1. By means of two vertical deflections at the end module 34 and the front module 33 the course of the endless transfer chain 9 is closed again.

Figure 9:
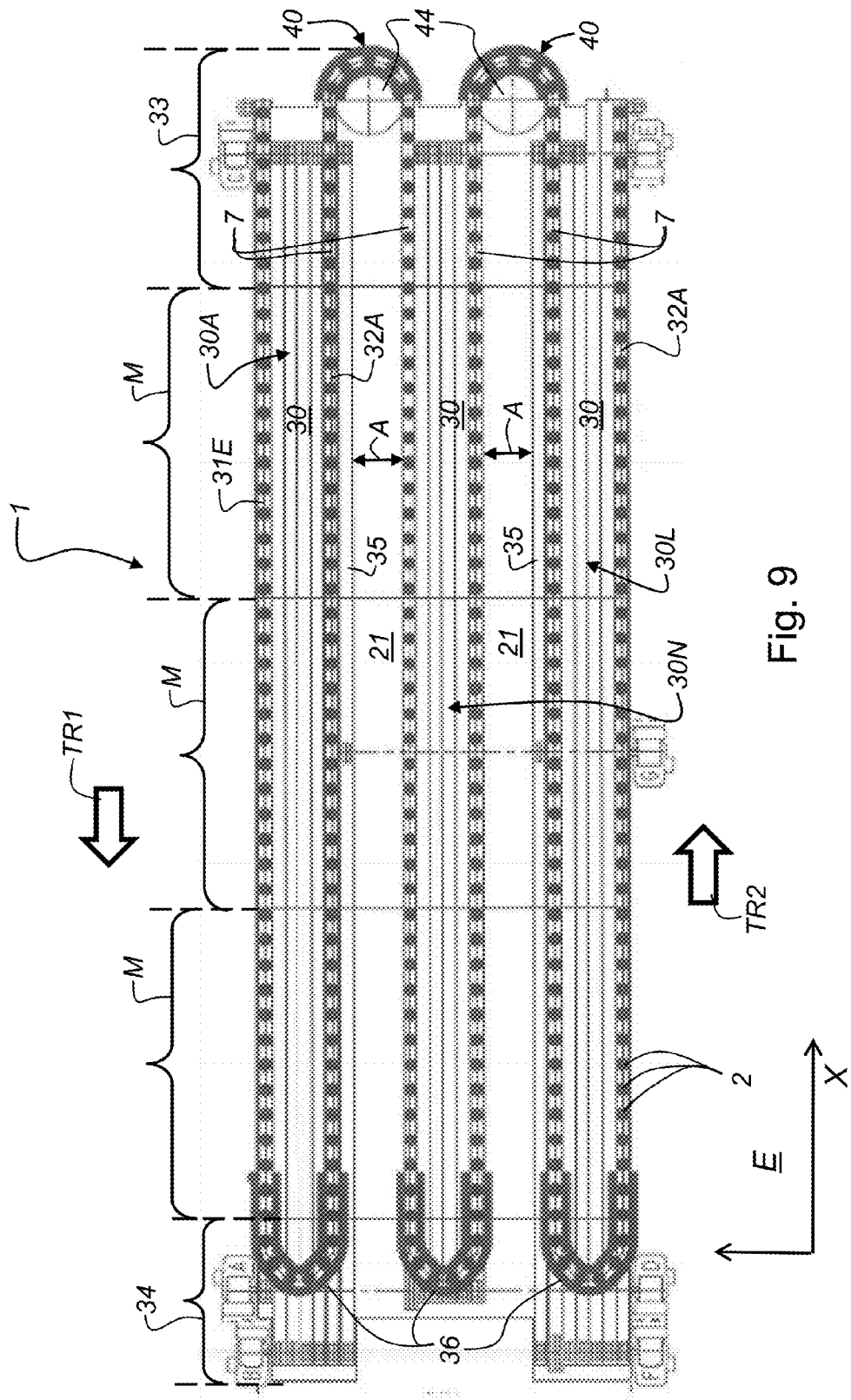
FIG. 9 shows a top view of a first embodiment of the buffer means according to the invention, wherein the maximum buffer capacity for the containers is set.

FIG. 9 shows a top view of the first embodiment of the buffer means 1 according to the invention, wherein the buffer capacity of the buffer means 1 is fully used. The buffer means 1 comprises the front module 33 and the end module 34. Between the front module 33 and the end module 34 three intermediate modules M are arranged in the embodiment shown in FIG. 9. The buffer means 1 has three buffer modules 30, arranged parallel to each other at a distance A. In the embodiment shown in FIG. 9 no conveyor tracks 22 are inserted in the distance A between the buffer modules 30. Instead of the conveyor tracks 22 it is also possible to use a cover 21, so that a uniform and closed surface E for the buffer means 1 can be achieved. The containers 2 enter the buffer means 1 along a first transport direction TR1 on an infeed conveyor track 31E of an initial buffer module 30A. Eventually the containers 2 leave the buffer means 1 via an outlet conveyor 32A of a last buffer module 30L of the buffer means 1 along a second transport direction TR2. The transfer devices 36, each of which respectively corresponds to a buffer module 30, are located in the region of the end module 34 of the buffer means 1. With the position of the transfer means 36 as shown in FIG. 9 the full buffer capacity of the buffer means 1 can be used. At the front module 33 of the buffer means 1 a transfer means 40 is arranged between each pair of neighboring modules 30. In the transfer means 40 between the initial buffer module 30A and the subsequent buffer module 30N the containers 2 can be transferred from the outlet conveyor track 32A of the initial buffer module 30A to the infeed conveyor track 31E of the subsequent buffer module 30N. With the transfer means 40 between the subsequent buffer module 30N and the last buffer module 30L the containers 2 can be transferred from the outlet conveyor track 32A of the subsequent buffer module 30N to the infeed conveyor track 31E of the last buffer module 30L.

According to the embodiments of the buffer means described in FIGS. 3 to 5A, a transfer means 40 is provided between two neighboring buffer modules 30. Each transfer means 40 essentially comprises an endless chain 7 and an upper redirection 44 and lower redirection 45 (see FIG. 11) provided at the front module 33. The upper redirection 44 and the lower redirection 45 are arranged in such a way in the buffer means 1 that the endless chain 7 forms the outlet conveyor track 32A of the initial buffer module 30A and the infeed conveyor track 31E of the subsequent buffer module 30N.

Figure 10:
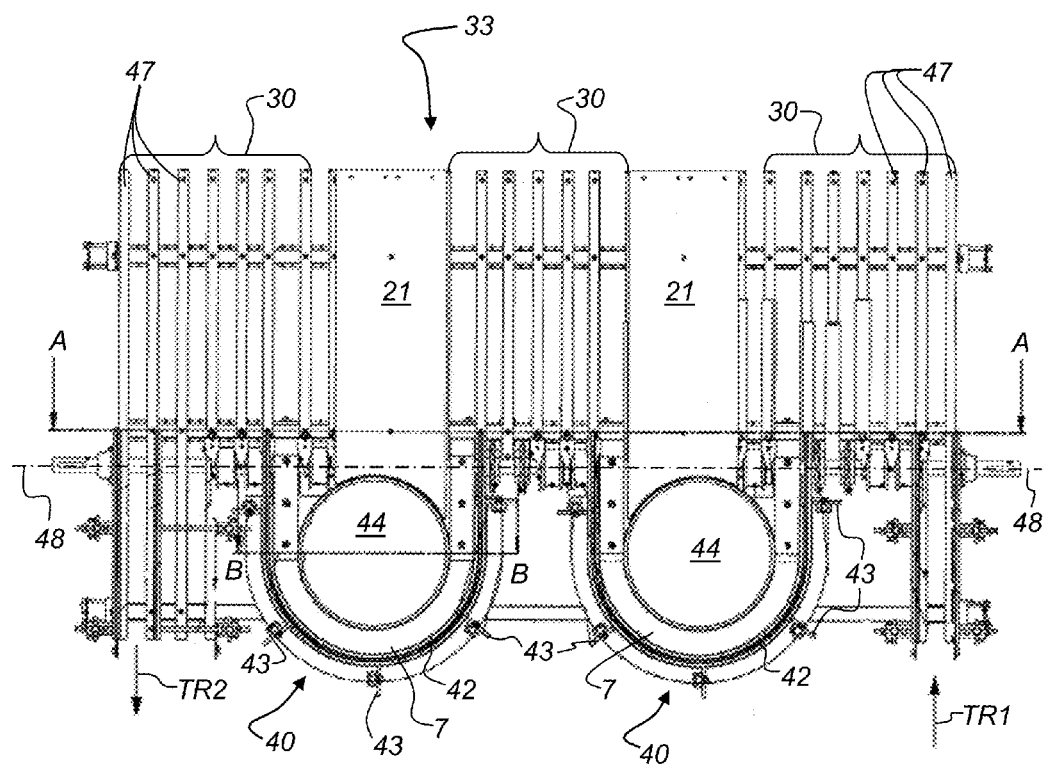
FIG. 10 shows a top view of a first embodiment of the front module of the buffer means according to the invention, wherein for the sake of clarity the conveyor tracks resting on the buffer means have been omitted.

FIG. 10 shows a top view of a first embodiment of the front module 33 of the buffer means 1 according to the invention. In the representation shown here, the conveyor tracks are not shown. The front module 33 is configured for a buffer means 1 comprising three buffer modules 30. The buffer module 30 carries a plurality of support rails 47, on which the driven conveyor tracks are running As already mentioned in the description of FIG. 9, a transfer means 40 is arranged between each of two neighboring buffer modules 30. The transfer means 40 comprises an upper redirection 44 and a lower redirection 45 (see FIG. 11). By means of the upper redirection 44 and the lower redirection 45 the endless chain 7 is redirected, which thus, as already described in FIG. 9, forms both the outlet conveyor track 32A of the initial buffer module 30A and the infeed conveyor track 31E of the subsequent buffer module 30N. In the representation shown in FIG. 10 the containers 2 (not shown here) enter the front module 33 along the first transport direction TR1 in the vicinity of the transfer means 40. The containers 2 leave the front module 33 along the second transport direction TR2. Between the buffer modules 30 arranged in parallel a cover 21 is provided. The cover 21 is necessary for the buffer means 1 to form the uniform and closed surface E. The endless chain 7 therein is conducted round the circular upper redirection 44. To the outer edge of the endless chain 7 there corresponds a guardrail 42. By means of the guardrail 42 the containers 2 are prevented from falling off the buffer means 1 during the redirection of the endless chain 7. By means of a plurality of adjusting elements 43 the guardrail 42 can be adapted to the containers 2 to be buffered in the buffer means 1, so that a free and uninhibited transport or redirection, respectively, of the containers 2 within the buffer means 1 is assured. Furthermore, all drive axles 48, by which the individual conveyor tracks can be driven with motors (not shown here), are connected with the buffer module 33.

Figure 11:
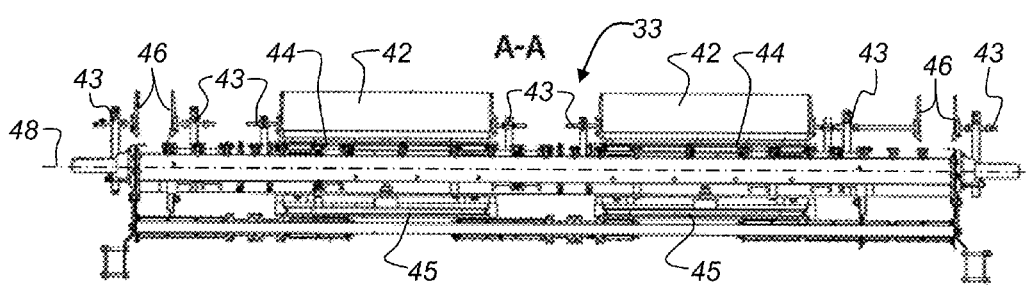
FIG. 11 shows a view along the section line A-A shown in FIG. 10 of the front module of the buffer means according to the invention.

FIG. 11 shows a view of the front module 33 along the direction marked A-A in FIG. 10. The guardrail 42 corresponding to the upper redirection 44 and the track guardrails 46 may respectively be adjusted to the width of the containers 2 to be transported by means of a plurality of adjusting elements 43. FIG. 11 furthermore shows the lower redirection 45 for the endless chain 7, corresponding to the upper redirection 44.

Figure 12:
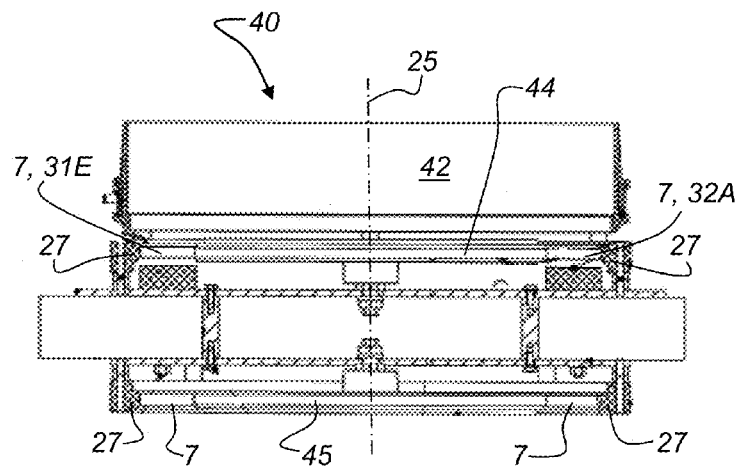
FIG. 12 shows a view along the section line B-B shown in FIG. 10 of the transfer means provided in the front module of the buffer means.

FIG. 12 shows a detailed view of the section through a transfer means 40 indicated B-B in FIG. 10. The guardrail 42 therein is arranged in such a way that it exhibits a distance to the surface of the upper redirection 44 and of the endless chain 7 conducted around the upper redirection 44. The upper redirection 44 and the lower redirection 45 are configured to rotate about a common axis 25. By the rotatability of the upper redirection 44 and of the lower redirection 45 the redirection of the endless chain 7 is made easier. The endless chain 7 with one edge makes contact with the upper redirection 44 or the lower redirection 45, respectively. With the other edge the endless chain 7 makes contact with a guidance 27. Thus, the endless chain 7 is fully guided and cannot come off. In the view shown in FIG. 12 the section of the endless chain 7 is in contact with the upper redirection 44 on the right hand side of FIG. 12 acts as outlet conveyor track 32A of a module 30. The section of the endless chain 7 in contact with the upper redirection 44 on the left hand side of FIG. 12 forms the infeed conveyor track 31E of a subsequent buffer module 30N.

Figure 13:
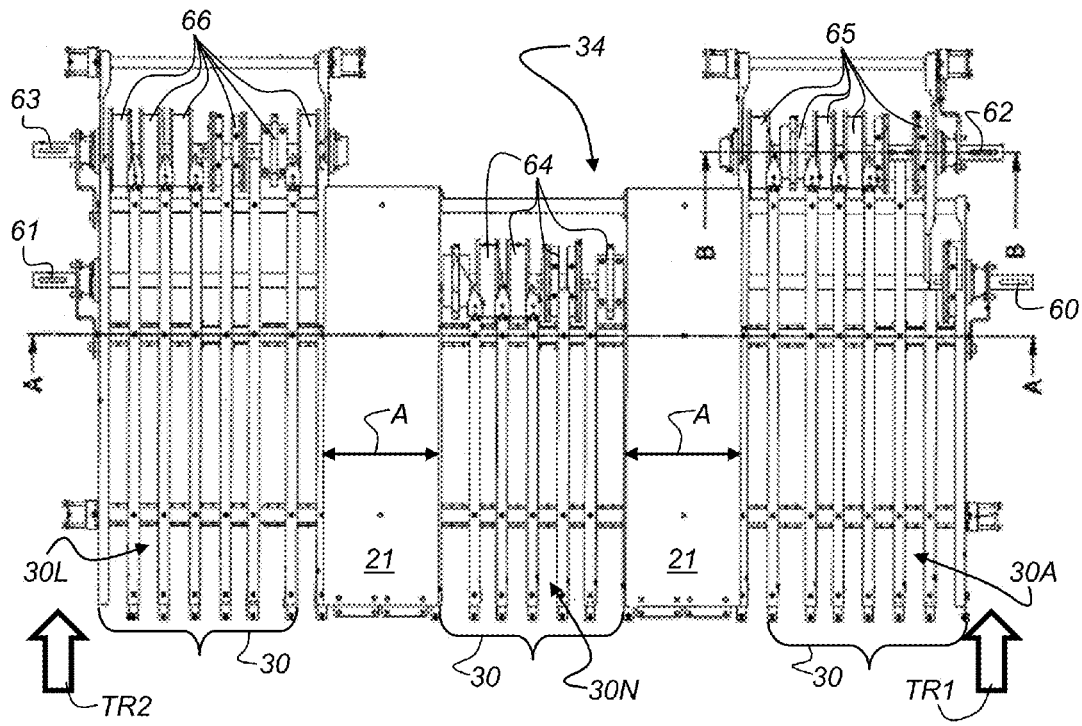
FIG. 13 shows a top view of a first embodiment of the end module of the buffer means according to the invention, wherein here, too, the individual conveyor tracks have been omitted for the sake of clarity.

FIG. 13 shows a top view of a first embodiment of the end module 34 of the buffer means 1. The embodiment of the end module 34 shown in FIG. 13 is suitable for a buffer means 1 composed of three buffer modules 30. A cover 21 is provided in the distance A between the individual modules 30, so that the uniform and closed plane E of the buffer means 1 is achieved. The end module 34 essentially is for redirecting the conveyor tracks of the individual buffer modules 30, so that these are directed back to the front module 33 in the lower region of the buffer means 1. Plural axles 60 to 63 run through the initial buffer module 30A, the subsequent buffer module 30N, as well as the last buffer module 30L. The axle 60 can be engaged by a corresponding drive mechanism. The axle 60 carries plural discs 64, so that plural conveyor tracks can be driven or redirected, respectively. To the initial buffer module 30A there furthermore corresponds an axle 62, which may also be connected with a drive mechanism. The axle 62 also carries plural discs 65, by means of which the conveyor tracks of the initial buffer module 30A may be driven or redirected, respectively. An axle 61, which extends into the region of the subsequent buffer module 30N, is provided at the last buffer module 30L. In this region of the subsequent buffer module 30N also plural discs 64 are situated, by means of which the conveyor tracks of the subsequent buffer module 30N can be driven or redirected, respectively. Furthermore an axle 63, which also carries plural discs 66, is provided at the last buffer module 30N. By means of these discs 66 the conveyor tracks of the last buffer module 30L can be driven or redirected, respectively.

Figure 14:
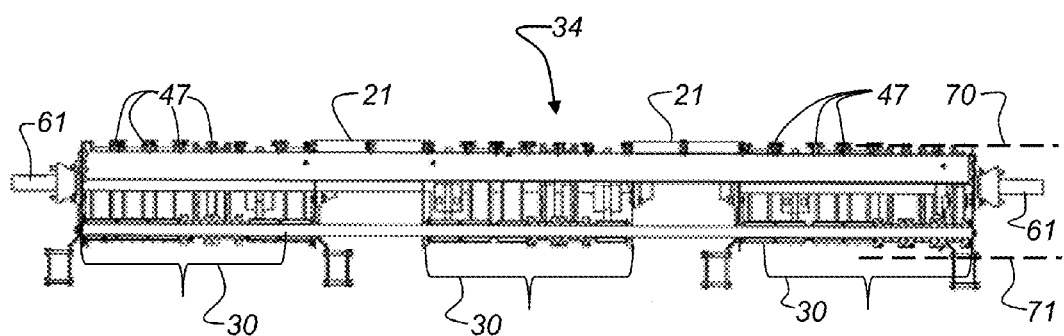
FIG. 14 shows a sectional view along the line A-A shown in FIG. 13.

FIG. 14 shows a view of the end module 34 of FIG. 13 along the section line marked A-A in FIG. 13. At the upper side 70 of the buffer means 1 plural support rails 47 correspond to each buffer module 30. The individual buffer modules 30 are separated by the cover 21. By means of the axle 61 essentially the conveyor tracks (not shown here) of the subsequent buffer module 30N can be driven. At the bottom side 71 of the buffer means 1 the conveyor tracks are directed back to the front module 33.

Figure 15:
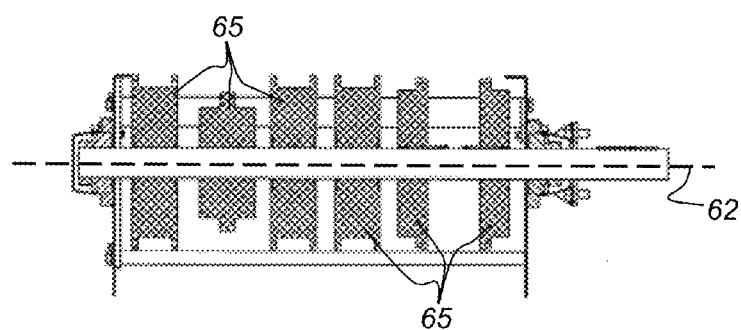
FIG. 15 shows a sectional view along the section line B-B shown in FIG. 13.

FIG. 15 shows a section view of the section line indicated B-B in FIG. 13. The axle 62, as can be seen from FIG. 13, is located at the initial buffer module 30A of the end module 34. The discs 65 carried by the axle 62 are for guiding, redirecting and/or driving of the individual conveyor tracks (not shown) of the initial buffer module 30A.

Figure 16:
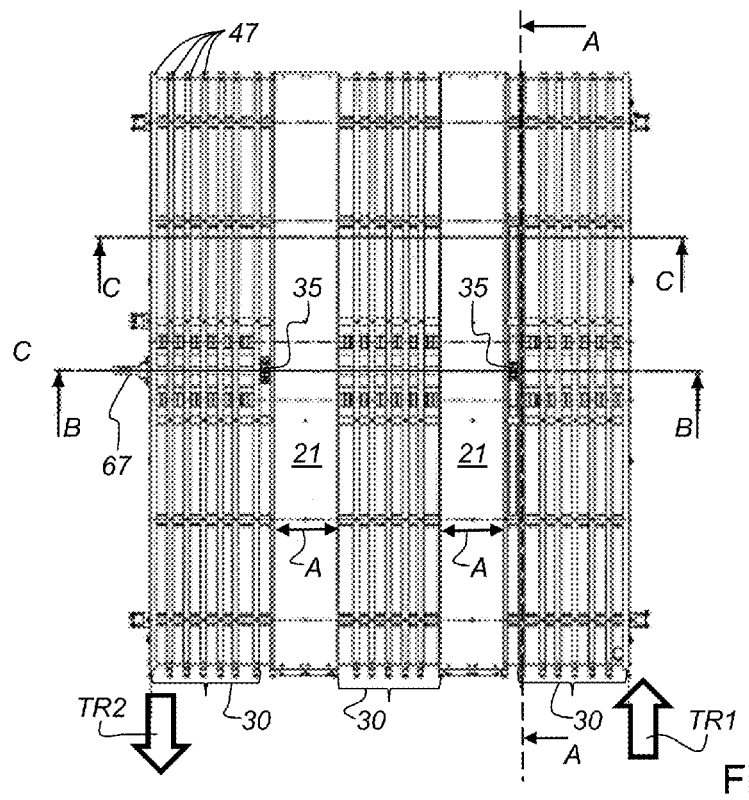
FIG. 16 shows a top view of a first embodiment of an intermediate module, which is arranged between the front module and the end module in the buffer means according to the invention.

FIG. 16 shows a top view of an embodiment of a buffer module M which has been inserted between the front module 33 and the end module 34. The intermediate module M shown in FIG. 16 also carries an axle 67. This axle 67 is also engaged by a drive mechanism, which ultimately is responsible for the movement of the sliding devices 35 both along the first transport direction TR1 and along the second transport direction TR2. The intermediate module M shown in FIG. 16 at least needs to be located between the end module 34 and the front module 33, because only in this way it is possible to displace the sliding devices 35 according to the required buffer capacity of the buffer means 1. The intermediate module M also comprises three individual buffer modules 30, which are arranged at a distance A from each other. In the distance A between the individual buffer modules 30 the cover 21 is located, in order to thus create a uniform and closed surface or plane E of the buffer means or intermediate module M, respectively. The individual buffer modules 30 carry the support rails 47 for the conveyor tracks (not shown) of the buffer means 1.

Figure 17:
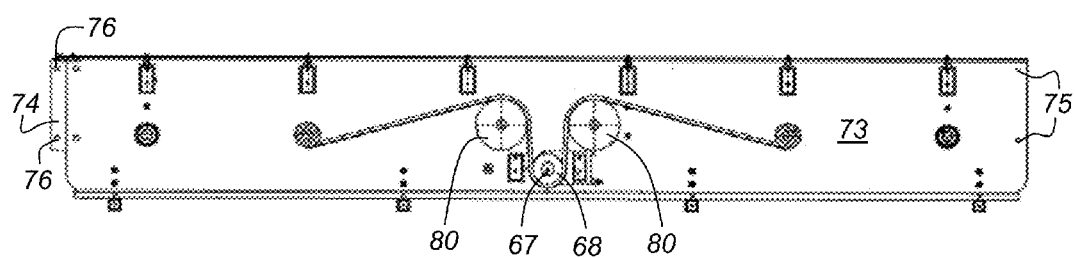
FIG. 17 shows a view along the section line A-A marked in FIG. 16, wherein here a frame element along the transport direction of the intermediate module is shown.

FIG. 17 shows a sectional view of the section line marked A-A in FIG. 16 and thus the side view of a frame portion 73 as it is used in the configuration of the intermediate module M. At one end the frame portion 73 has a lug 74. The lug 74 has plural bores 76. Plural bores 75 are also formed at the end of the frame portion 73 opposite the lug 74. In case more than two intermediate modules M are inserted between the front module 33 and the end module 34, the intermediate module M can be connected to a further intermediate module M by the lug 74. To this end bolts (not shown) are inserted through the bores 76 of the lug of the further intermediate module M to be connected with the already present intermediate module M and through the bores 75 of the already present intermediate module M. In this way it is possible to adjust the length of the buffer means 1 according to customer requirements, based on a modular configuration. Furthermore, in this view the chain path of the sliding device 35 around the drive mechanism (not shown here), which engages the axle 67, is shown. For transmitting the torque to the chain of the sliding device 35, drive wheels 68 are mounted on the axle 67. In order to provide for a maximum looping of the drive wheels 68 of the chain of the sliding device 35, additional guide axles 78 with deflection rollers 80 are used. In addition to the deflection rollers 80 also the rollers 79 of the further tracks for the chain return are provided on these guide axles 78.

Figure 18:
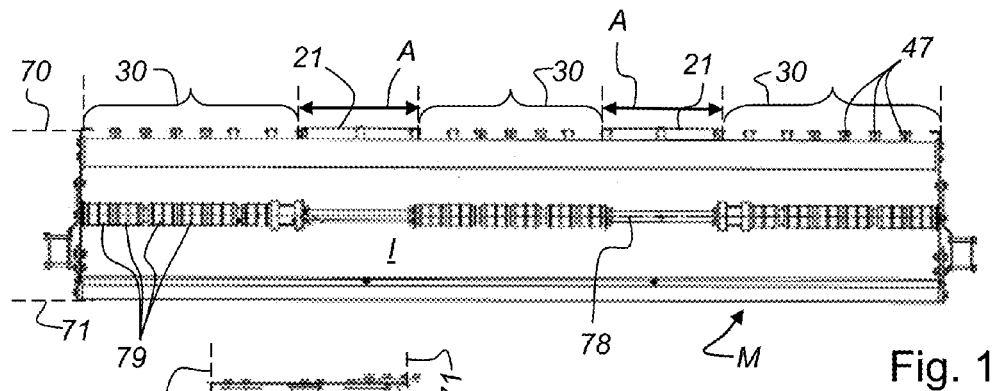
FIG. 18 shows a sectional view along the section line C-C marked in FIG. 16.

FIG. 18 shows a section through the intermediate module M along the section line C-C indicated in FIG. 16. The intermediate module M is configured box-like. On the upper side 70 of the intermediate module M a plurality of support rails 47 are provided, on which the conveyor tracks (not shown) of the individual buffer modules 30 are guided. The buffer modules 30 are also arranged at a distance A from each other. Within the box-like configuration of the intermediate module M at least one guide axle 78 is provided. By means of the guide axle 78 it is possible to redirect the conveyor tracks in the inner area I of the intermediate module M from the end module 34 to the front module 33. The first transfer conveyors 31, the second transfer conveyors 32, the infeed conveyor tracks 31E, the outlet conveyor tracks 32A, the sliding device 35 and the conveyor tracks 22 therein rest on corresponding rollers 79 of the guide axle 78.

Figure 19:
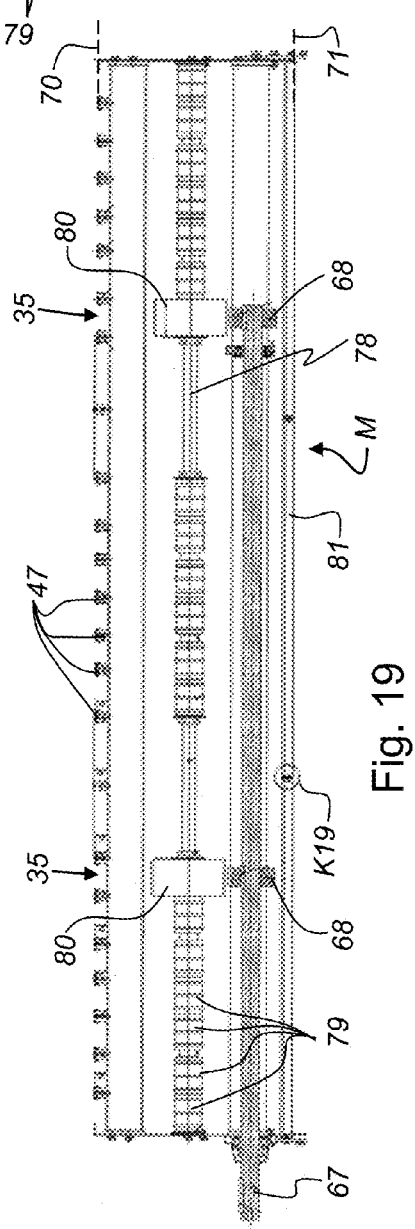
FIG. 19 shows a sectional view along the line B-B marked in FIG. 16.

FIG. 19 shows a view of the intermediate module M along the section line indicated B-B in FIG. 16. To the axle 67 of the intermediate module M there correspond two further guide axles 78, which also carry a plurality of rollers 79 for guiding the conveyor tracks (not shown). Furthermore, the guide axle 78 carries plural deflection rollers 80, wherein each deflection roller 80 directly corresponds to the sliding device 35 on the upper side 70 of the intermediate module M. The axle 67 directly affects the sliding device 35 through the drive wheels 68. The drive mechanism (not shown) connected with the axle 67 is operated, if an increased capacity for buffering the containers 2 is required within the buffer means 1. The sliding device 35 can be displaced on the upper side 70 of the intermediate module M according to the required buffer capacity. The intermediate module M is provided with a cover 81 on the bottom side 71.

Figure 20:
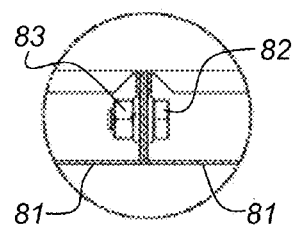
FIG. 20 shows an enlarged representation of the area marked with the circle K19 in FIG. 19.

FIG. 20 shows an enlarged representation of the area marked K19 in FIG. 19. The cover 81 is also configured in a modular fashion. The individual modules of the cover 81 can be connected to each other by a screw 82 and a nut 83. In this way also quick and easy access to the inner area I of the buffer module M is possible.

Figure 21:
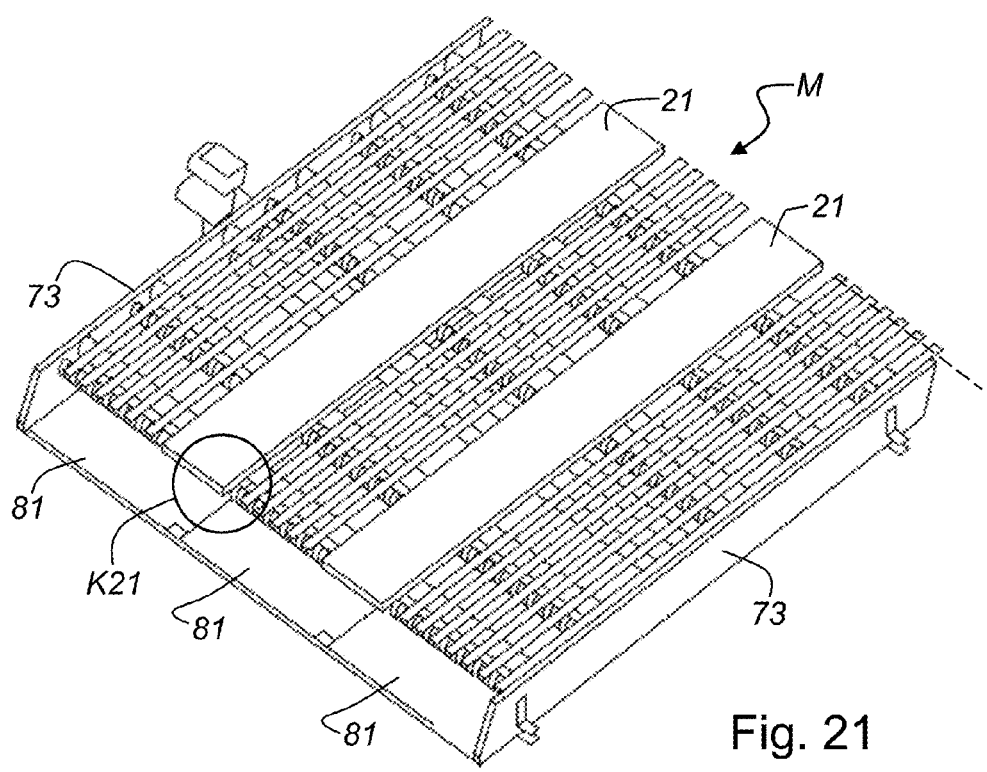
FIG. 21 shows a perspective view of the first embodiment of the intermediate module of the buffer means according to the invention.

FIG. 21 shows a perspective view of the intermediate module M, which is connected to a drive mechanism for moving the sliding device 35 (not shown here) along the intermediate module M. In FIG. 21 the box-like configuration of the intermediate module M is obvious. On the bottom side 71 the intermediate module M is provided with the cover 81. The frame portions 73, which connect the upper side 70 with the bottom side 71 of the intermediate module M, are provided for lateral stabilization of the intermediate module M.

Figure 22:
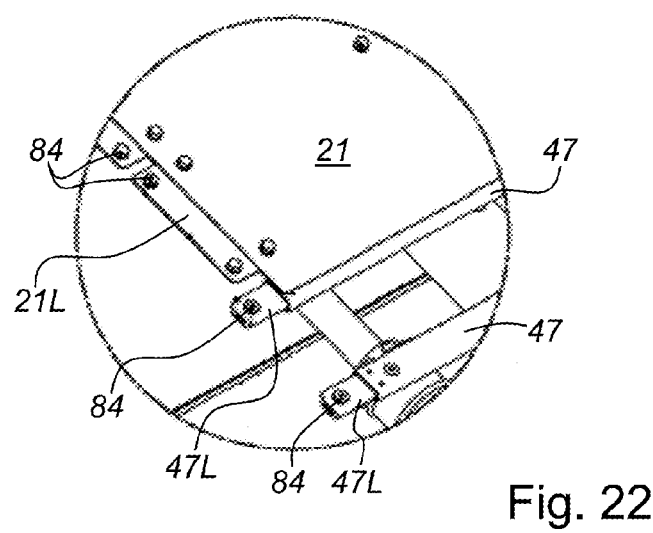
FIG. 22 shows an enlarged representation of the area marked with K21 in FIG. 21.

FIG. 22 shows an enlarged representation of the area marked K21 in FIG. 21. The cover 21 exhibits at least one lug 21L. Likewise, each support rail 47 exhibits a lug 47L. By means of these lugs 21L and 47L intermediate modules M can be connected to each other. For this purpose the lugs 21L of the cover 21 and the lugs 47L of the support rails 47 exhibit corresponding mounting elements 84, by which the individual neighboring intermediate modules M of the buffer means 1 can be connected to each other.

Figures 23, 24, 27:
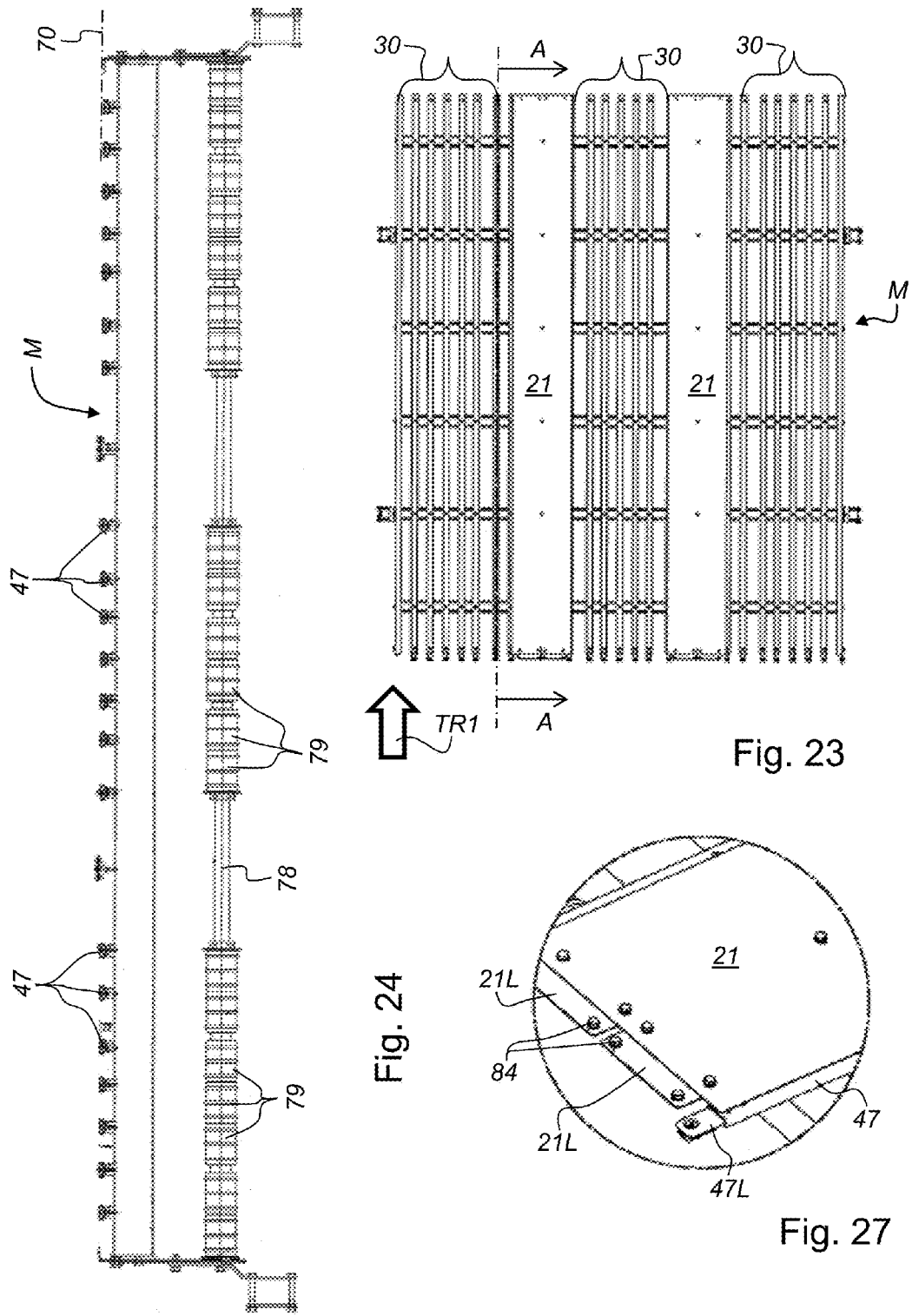
FIG. 23 shows a top view of an intermediate module of the first embodiment of the buffer means according to the invention, wherein this intermediate module does not have a drive mechanism for the sliding device.
FIG. 24 shows a view of the intermediate module shown in FIG. 23 from the direction of view marked X.
FIG. 27 shows an enlarged view of the area marked with the circle K25 in FIG. 25.

FIG. 23 shows a top view of an intermediate module M, which is intended only for guiding the conveyor tracks of the buffer means 1. This intermediate module M shown in FIG. 23 is only for increasing the length or buffer capacity, respectively, of the buffer means 1. The intermediate module M, in analogy with the intermediate module M already described in FIG. 16, also comprises three buffer modules 30 arranged at a distance A from each other. The cover 21 is provided in the distance A between the buffer modules 30.

FIG. 24 shows a view of the intermediate module M from the first transport direction TR1. Here also at least one guide axle 78 is inserted between the lateral frame portions 73 (see FIGS. 17, 21, 25, 26) of the intermediate module M. The guide axle 78 carries a plurality of rollers 79, which are provided for the return of the conveyor tracks (not shown here) moved on the upper side 70 of the intermediate module M. The conveyor tracks are supported on the correspondingly provided support rails 47 on the upper side 70 of the intermediate module M.

Figure 25:
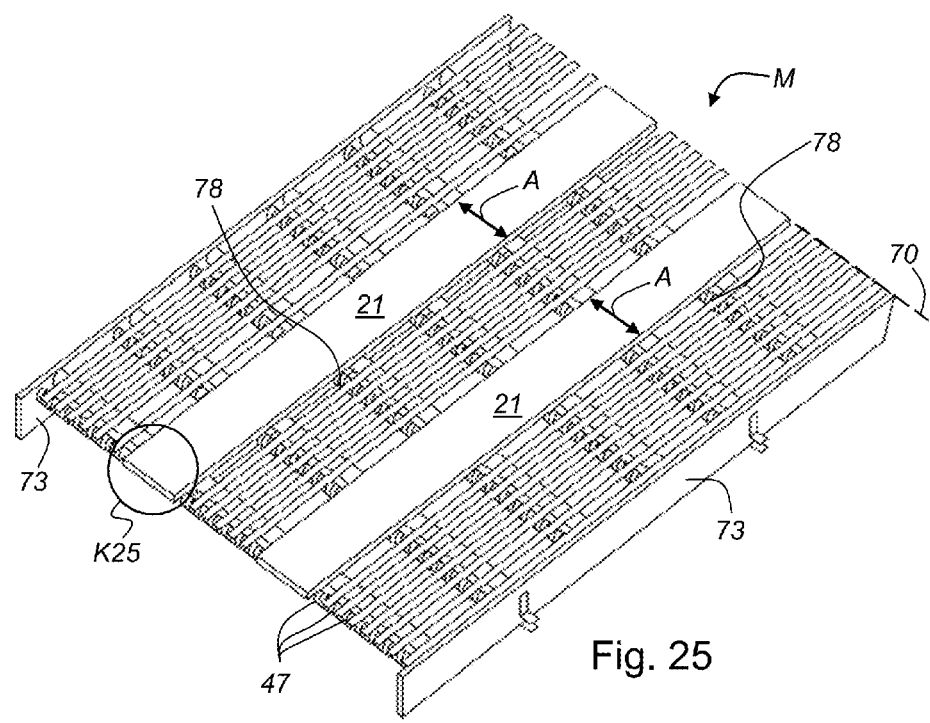
FIG. 25 shows a perspective view of an intermediate module of the first embodiment without an additional drive mechanism.

FIG. 25 shows a perspective view of the intermediate module M, which does not comprise a drive mechanism for the movement of the sliding device 35. The intermediate module M is also of a box-like configuration and exhibits at least two lateral frame portions 73 for stabilization and for the attachment of further elements (not shown), respectively.

Figure 26:
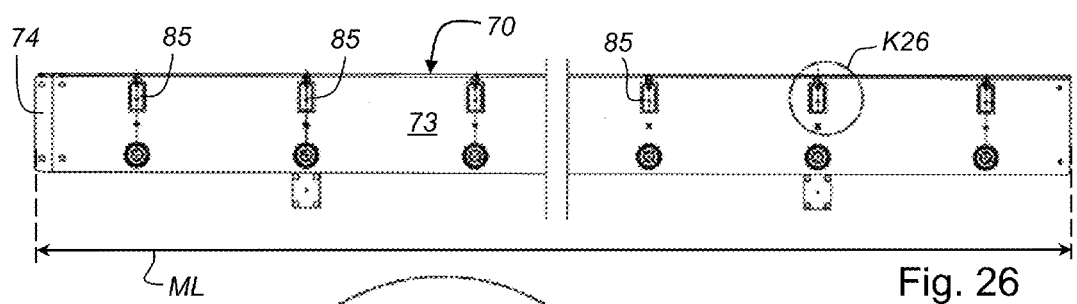
FIG. 26 shows a view along the section line marked A-A in FIG. 23.

FIG. 26 shows a view along the section line A-A shown in FIG. 23. The frame portion 73 also has a lug 74, by means of which the individual neighboring intermediate modules M of the buffer means 1 can be connected. Due to this modular configuration the length of the buffer means 1 can be easily adapted to the requirements of the customer. As already mentioned, all intermediate modules M have an equal module length ML. Furthermore the frame portion 73 exhibits plural seats 85 for the attachment of further elements (not shown) of the buffer means 1.

FIG. 27 shows an enlarged representation of the area marked K25 in FIG. 25. The cover 21 exhibits at least one lug 21L. Likewise each support rail 47 is provided with a lug 47L. The lugs 21L and 47L carry corresponding mounting elements 84, by means of which the individual neighboring intermediate modules M can be connected to each other.

Figure 28:
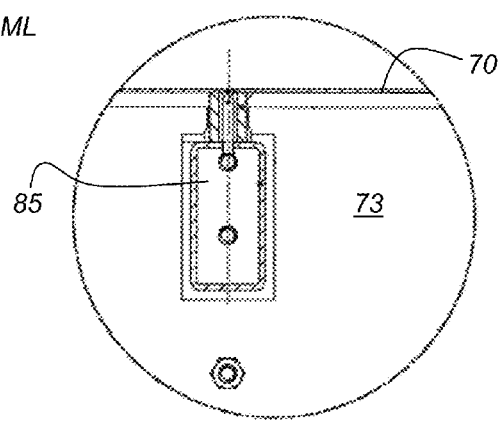
FIG. 28 shows an enlarged view of the area marked K26 in FIG. 26.

FIG. 28 shows an enlarged representation of the area marked K26 in FIG. 26. The frame portion 73 exhibits plural seats 85 for the attachment of a further element (not shown) of the buffer means 1.

Figure 29:
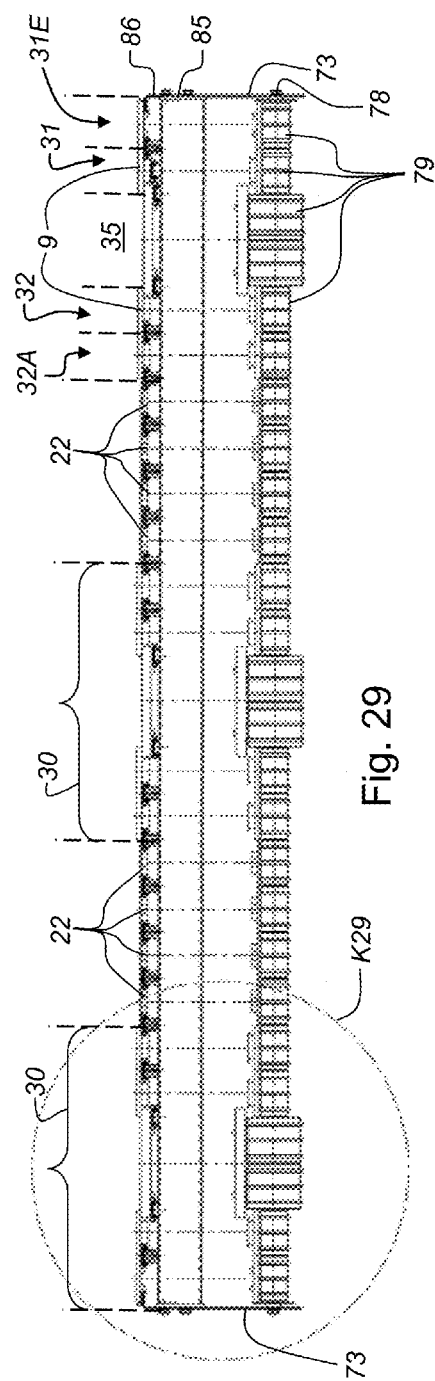
FIG. 29 shows a sectional view of the third embodiment through the buffer means according to the invention transverse to the transport direction, wherein the buffer means is composed of three buffer modules.

FIG. 29 shows a sectional view of the third embodiment shown in FIG. 5 of the buffer means 1 along the section line S-S. In the embodiment shown in FIG. 29 also three buffer modules 30 are arranged parallel to each other. Between the individual buffer modules 30 conveyor tracks 22 are provided, which can be driven along the first transport direction TR1, so that containers 2 potentially toppled over can be transported towards the end module 34. Between the two lateral frame portions 73 a guide axle 78 is provided, which together with the rollers 79 forms a guide for the conveyor tracks, in order to return them to the front module 33 of the buffer means 1. The individual conveyor tracks, like for example the infeed conveyor tracks 31E, the first transfer conveyors 31, the second transfer conveyors 32, the outlet conveyor tracks 32A, the conveyor tracks 22 or the sliding devices 35, respectively, therein are supported on a plurality of rollers 79. For the description of FIG. 29 it is assumed that the first transport direction TR1 is directed into the plane of the drawing. Between the infeed conveyor track 31E and the outlet conveyor track 32A immediately the endless transfer chain 9 follows. In the center of the initial buffer module 30A the sliding device 35 is located, of which the louver band 5 (see FIG. 30) is shown.

Figure 30:
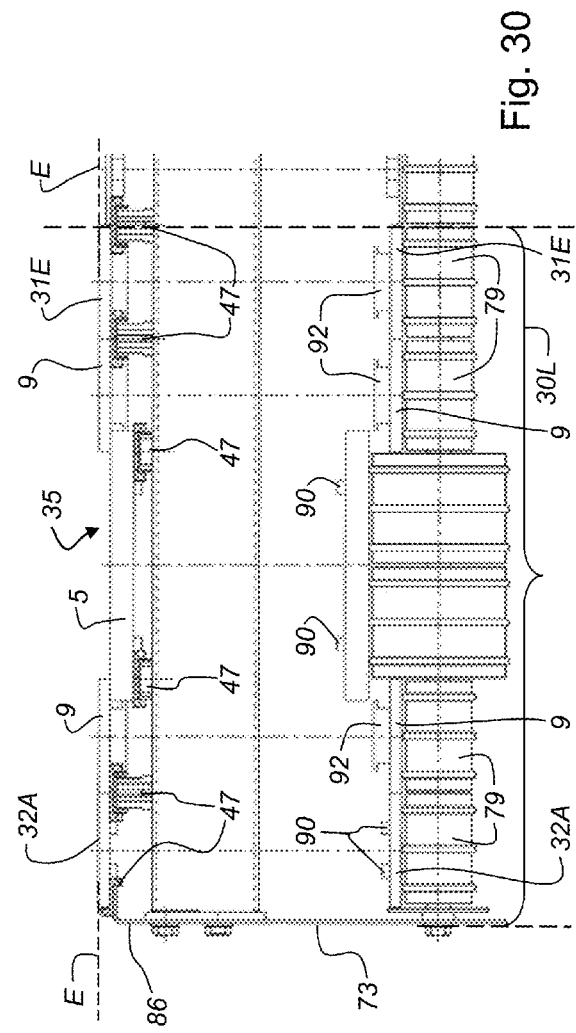
FIG. 30 shows an enlarged representation of the area marked K29 in FIG. 29.

FIG. 30 shows an enlarged representation of the area marked K29 in FIG. 29. In FIG. 30 thus the configuration of the last buffer module 30L is described. On the upper side 70 of the buffer means 1 the individual conveyor tracks of the last buffer module 30L are supported on the correspondingly provided guides 47. The outlet conveyor track 32A of the last buffer module 30L has two extensions 90, which effect a lateral stabilization and guiding of the outlet conveyor track 32A, on the side facing the guides 47. In the middle between the infeed conveyor track 31E and the outlet conveyor track 32A the louver band 5 of the sliding device 35 is provided. The louver band 5 also has two extensions 90, which effect a lateral guiding of the louver band 5. Between the infeed conveyor track 31E and the louver band 5, as well as between the louver band 5 and the outlet conveyor track 32A the endless transfer chain 9 is located. The endless transfer chain 9 exhibits a TAB-guidance 92 on the side facing the guides 47. The endless transfer chain 9 is laterally supported by the TAB-guidance on the guide 47 with the louver band 5. Additionally, the TAB-guidance 92 extends under the guide 47 and thus provides for a reliable guiding of the transfer chain 9 in the plane E. The infeed conveyor track 31E of the last buffer module 30L also exhibits a TAB-guidance 92. By the TAB-guidance 92 of the infeed conveyor track 31E a lateral guiding between the support rails 47 and at the same time a guiding of the infeed conveyor track 31E within the plane E is achieved. Thus all endless chains 7 and 9 are secured against a lateral rising in the horizontal deflections 11, 12, 44, and 45.

In FIG. 31 also the sectional view of the embodiment of the buffer means 1 shown in FIG. 5 along the section line S-S is shown. The difference between FIG. 31 and FIG. 29 is that the individual conveyor tracks or the supports for the individual conveyor tracks are configured differently. An essential difference is that the guide axle 78 located between the lateral frame portions 73 carries a plurality of rollers 79, all of which exhibit the same diameter. Contrary to FIG. 29 the rollers 79 for guiding the louver band 5 below the upper side 70 of the buffer means 1 have the same diameter as the other rollers 79.

FIG. 32 shows an enlarged representation of the area marked K31 in FIG. 31. Likewise the last buffer module 30L is described in cross section. The configuration of the individual conveyor tracks in the other buffer modules 30 is analogous. The outlet conveyor track 32A of the last buffer module 30L has two extensions 90, by which the outlet conveyor track 32A is laterally supported on the support rails 47. In the center between the infeed conveyor track 31E and the outlet conveyor track 32A the louver band 5 of the sliding device 35 is provided. The louver band 5 also has two extensions 90, by which the louver band 5 supports itself laterally on and is guided by the support rails 47, on the side facing the support rails 47. Between the infeed conveyor track 31E and the louver band 5 as well as between the louver band 5 and the outlet conveyor track 32A the endless transfer chain 9 is provided. The endless transfer chain 9 also exhibits a TAB-guidance 92 on the side facing the support rails 47. This TAB-guidance 92 is guided by the support rail 47 shared by the outlet conveyor track 32A, the endless transfer chain 9, and the infeed conveyor track 31E with the endless transfer chain 9. For support and guidance, respectively, of the endless transfer chain 9 the louver band 5 has a larger chain height D. Instead of the higher chain, which requires a lot of material, a thin chain with an U-shaped contour or ridges attached at the sides for heightening at the sides may be used. Thus along the entire length of the buffer modules the endless transfer chain 9 is guided laterally with respect to the louver band 5, independent of the position of the transfer device 36. In the vicinity of the sliding device 31 the deflection pulleys 11 and 12 take over the guiding of the transfer chain 9 on the inner side by engaging the upper notch 50. Analogously the redirections 44 and 45, as well as the outer guidance 27, engage the TAB-guidances of the endless chain 7. Thus, again all endless chains 7 and 9 are secured against a lateral rising in the horizontal deflections 11, 12, 44, and 45.

Figure 32A:
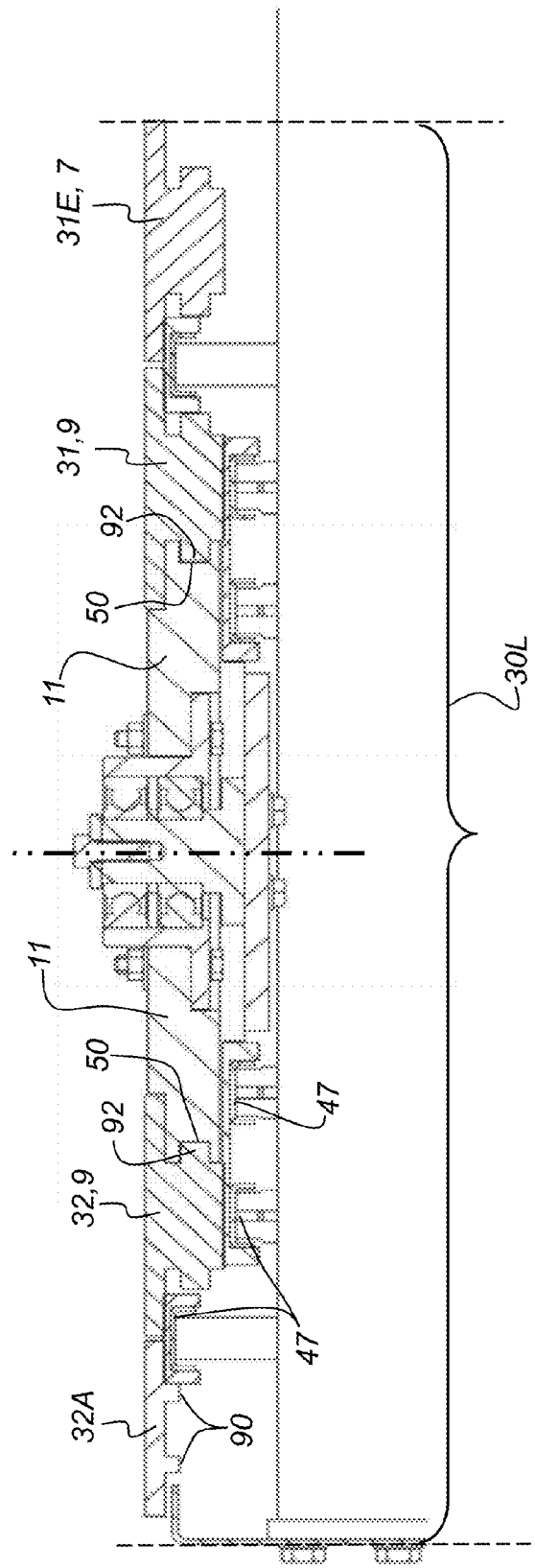
FIG. 32A shows an enlarged sectional view through the sliding device of the area marked K31 in FIG. 31.

FIG. 32A shows an enlarged sectional view through the sliding device of the area marked K31 in FIG. 31, however, with a further preferred variant of the TAB-chains and their guidance. Again the last buffer module 30L is described in cross section. The configuration of the individual conveyor tracks in the other buffer modules 30 is analogous. The outlet conveyor track 32A in the last buffer module 30L has two extensions 90, by which the outlet conveyor track 32A is laterally supported on the support rails 47. In the center between the infeed conveyor track 31E and the outlet conveyor track 32A the first deflection pulley 11 of the sliding device 35 is provided. The deflection pulley 11 is pivoted on a sliding device 35, and the sliding device 35 is supported and guided by support rails 47. The endless transfer chain 9 is provided between the infeed conveyor track 31E and the deflection pulley 11, and between the deflection pulley 11 and the outlet conveyor track 32A. The endless transfer chain 9 also has a TAB-guidance 92 on the side facing the support rails 47. This TAB-guidance is guided laterally on the support rail 47, which is shared by the outlet conveyor track 32A, the endless transfer chain 9, and the infeed conveyor track 31E with the endless transfer chain 9. In the vicinity of the sliding device 35 the deflection pulleys 11 and 12 take over the guiding of the transfer chain 9 on the inner side by engaging the upper notch 50. The outer guidance of the endless transfer chain 9 in the vicinity of the sliding device 35 is effected also by an opposite circular guide formed in the carrier board (not shown) of the sliding device 35. Analogously, the redirections 44 and 45, as well as the outer guidance 27, engage the TAB-guidance of the endless chain 7. Thus, again, all endless chains 7 and 9 are secured against a lateral rising in the horizontal deflections 11, 12, 44, and 45.

Figure 33:
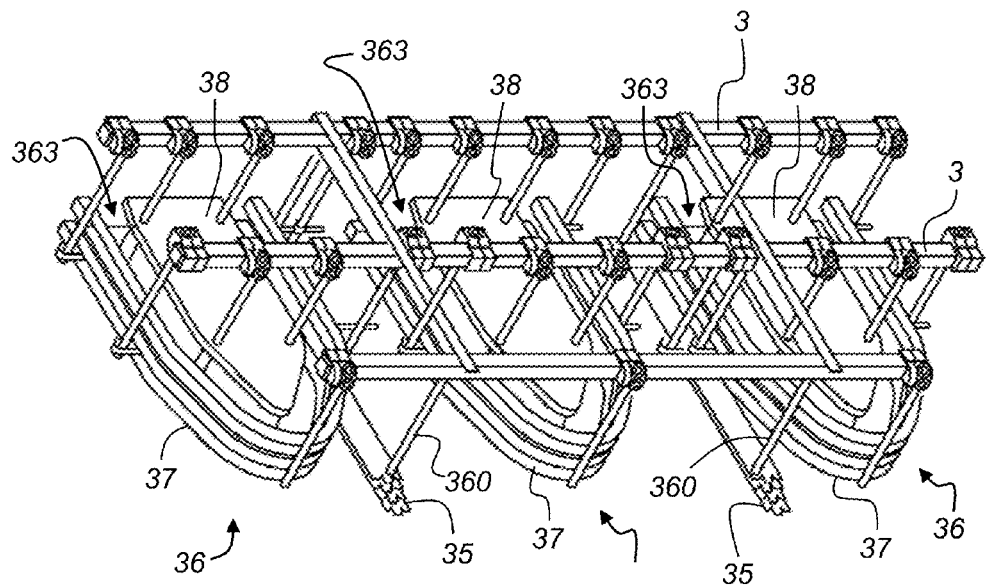
FIG. 33 shows a perspective view of the arrangement of three transfer devices of a first embodiment, wherein each is assigned to a buffer module.

FIG. 33 shows a perspective view of three transfer devices 36, each of which is assigned to a buffer module 30. Each transfer device 36 has an outer guide 37 and an inner guide 38. The outer guide 37 and the inner guide 38 are arranged in such a way that a track 363 is formed, in which the containers 2 to be buffered or guided, respectively, are transferred from the infeed conveyor track 31E of a buffer module 30 to an outlet conveyor track 32A of the buffer module 30. The individual transfer devices 36 are mounted on a holding structure 3. The entire holding structure 3 is supported on the sliding device 35 by means of at least one post 360. In the embodiment shown in FIG. 33 two sliding devices 35 are provided, so that at least two posts 360 are provided, which connect the holding structure 3 to the sliding devices 35. Due to this arrangement the transfer devices 36 can be displaced freely and linearly over the respective buffer modules 30.

FIG. 34 shows a top view of the holding structure 3 with the three transfer devices 36 arranged on it according to FIG. 33. The inner guide 38 and the outer guide 37 of each transfer device 36 are mounted to the holding structure 3 with corresponding mounting elements 39. Alternatively the outer guide 37 may be replaced with a fitting element. This is inserted into a provided guide and locked in place by means of a quick fastener. For an exchange the transfer device is moved to the end module 34 in transport direction TR1, as there all buffer modules 30 of the buffer means 1 are freely accessible. In this way for example the width of a track 363 can be changed easily and quickly.

FIG. 35 shows a front view of the arrangement of the transfer devices 36 according to FIG. 33 in transport direction. The inner guide 38 and the outer guide 37 of each transfer device 36 hang from a plurality of arms 41. The poles or posts 360 which support the transfer devices 36 on the sliding devices 35 are also mounted on the holding structure 3 in an adjustable manner. The arms 41 carry the adjusting elements 49 (see FIG. 35), through which the width of the track or the position of the outer guide 37, respectively, can be changed in a simple way.

Figure 36:
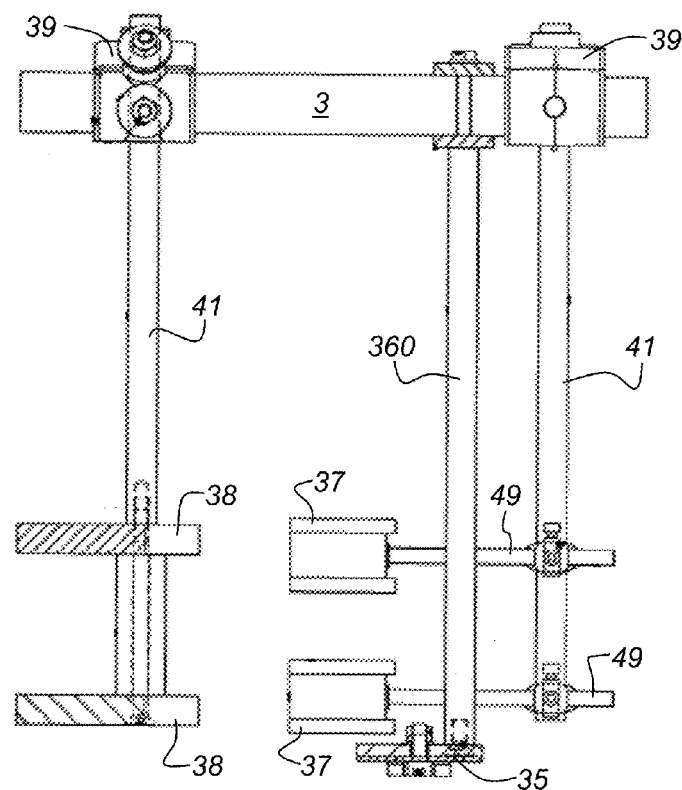
FIG. 36 shows a sectional view along the section line marked A-A in FIG. 34; and, FIG. 37 shows a perspective view of a further embodiment of the buffer means according to the invention, wherein at least one buffer module is shaped as a helix.

FIG. 36 shows the view of the section line indicated A-A in FIG. 34. The transfer device 36 is attached to the holding structure 3 with arms 41 in an adjustable manner. One of the arms 41 carries the inner guide 38, which comprises two guiding elements. Likewise a further arm 41 carries the outer guide 37, which also comprises two guiding elements, which are adjustable independently of each other. The outer guide 37 itself is arranged on an adjusting element 49. The width of the track 363 (see FIG. 33) formed by the inner guide 38 and the outer guide 37 can be set with the adjusting element 49. The holding structure 3 is supported on the sliding device 35 by a pole or post 360. As already described previously, the holding structure 3 with the at least one transfer device 36 can be displaced by means of the sliding device 35 in such a way that a buffer capacity of the buffer means 1 can be set.

Figure 37:
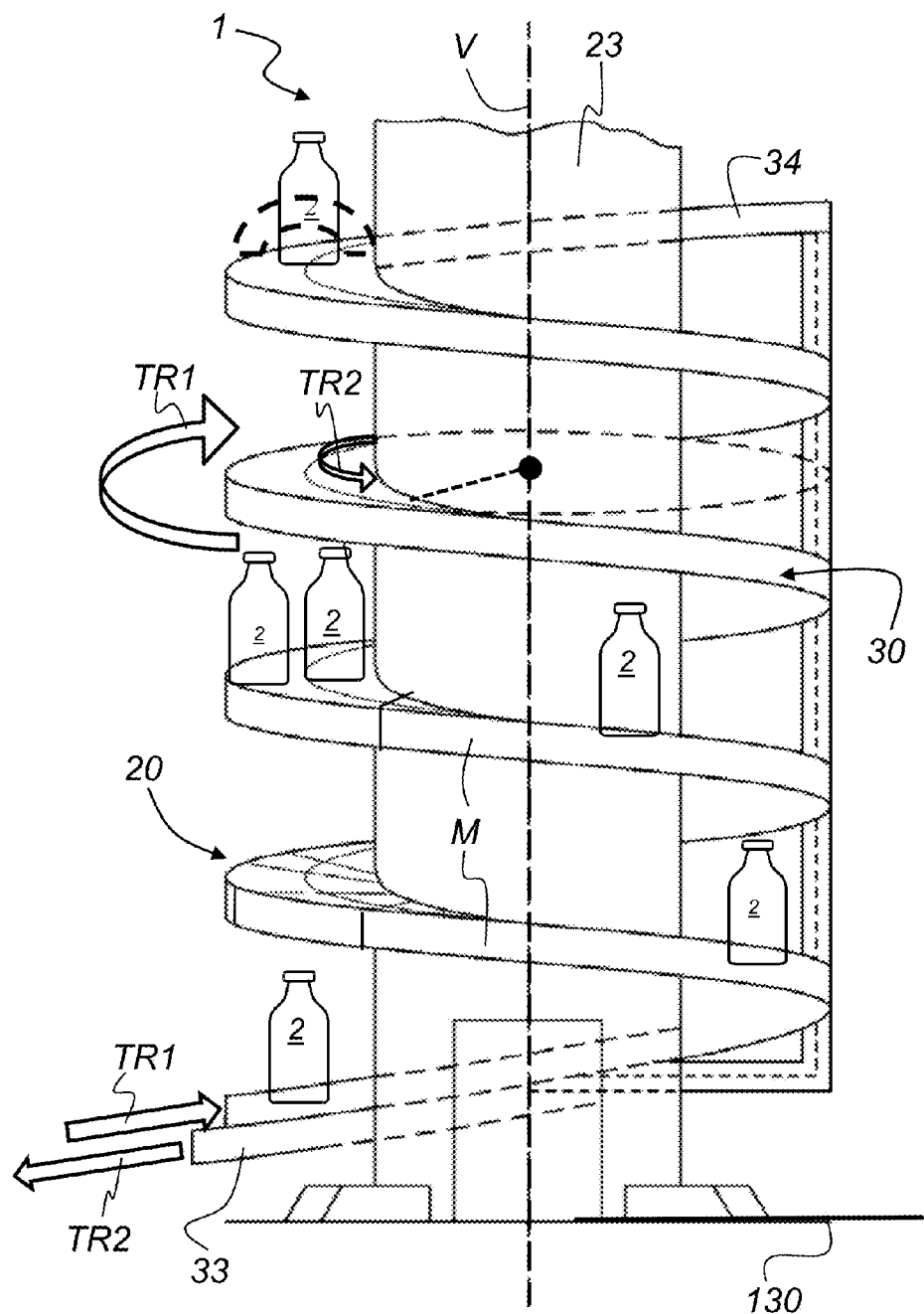

FIG. 37 shows a further embodiment of the buffer means 1 according to the invention. Here a buffer module 30 is shaped to the likeness of a vertical helix 20. The helix 20 is mounted to a carrier 23 and extends in vertical direction V. The buffer module 30 also has a front module 33 and an end module 34. Between the front module 33 and the end module 34 at least one intermediate module M is inserted. The number of intermediate modules M between the front module 33 and the end module 34 is determined by the required total length of the buffer means 1. The intermediate modules M are curved according to the shape of the helix 20 and exhibit a constant module length ML. The containers 2 moving along the buffer means 1 are correspondingly transported in the vertical direction V along the helix 20 on an infeed conveyor track 31E. The buffer module 30 also exhibits a sliding device 35, on which the transfer device 36 is supported. By means of the transfer device 36 the containers 2 are transferred from the infeed conveyor track 31E to the outlet conveyor track 32A of the buffer module 30. The outlet conveyor track 32A returns the containers 2 to the front module 33, which is situated in the vicinity of the floor space 130 of the buffer means 1, according to the embodiment shown in FIG. 37. As already described, the sliding device 35 is displaced along the buffer module 30 shaped as the helix 20, in order to thus change the buffer capacity of the buffer means 1. The transfer of the containers 2 from the infeed conveyor track 31E to the outlet conveyor track 32A has already been discussed in detail in the context of the embodiments described previously.

Furthermore, the invention also discloses a method for buffering containers 2 according to the FIFO-principle. A buffer means 1 receives the containers 2 from a first container handling unit 110 (see FIG. 1) on an infeed conveyor track 31E. The infeed conveyor track 31E is part of a buffer module 30 of the buffer means 1. The containers 2 in the buffer means 1 are transferred from the infeed conveyor track 31E of the buffer module 30 to an outlet conveyor track 32A of the buffer module 30 or of the buffer means 1, respectively, by means of a transfer device 36, which has an inner guide 38 and an outer guide 37. During transfer from the infeed conveyor track 31E to the outlet conveyor track 32A the containers 2 are conducted via further at least two drivable conveyors 31, 32. For setting the required buffer capacity of the buffer means 1 a control unit 105 is provided, which is connected with the container handling apparatus 100. A sliding device 35 corresponds to the buffer module 30 or each of the buffer modules 30, respectively, so that the transfer device 36 can be displaced with the sliding device 35 in parallel along the infeed conveyor track 31E or the outlet conveyor track 32A according to the required buffer capacity. The required buffer capacity is determined by the control unit 105 and is correspondingly transmitted to the control of the sliding device 35.

It is obvious to a person skilled in the art that various drive mechanisms need to be provided for driving the various conveyors (infeed conveyor track 31E, outlet conveyor track 32A, conveyors 31, 32, etc). The drive mechanisms therein need to be configured in such a way that a disruption-free and individually controllable driving of the individual conveyors and of the sliding device 35 is assured.

The invention has been described with reference to preferred embodiments. However, it is obvious to a person skilled in the art that modifications and alterations may be made without leaving the scope of the subsequent claims.

REFERENCE NUMERALS 1 buffer means
2 article (container)
3 holding structure
5 louver band
50 upper groove/edge
7 endless chain
9 endless transfer chain
10 infeed
11 first deflection pulley
12 second deflection pulley
14 outlet
20 vertical helix
21 cover
21L lug of cover
22 conveyor track
23 carrier
25 axis
27 outer guidance of endless chain
30 buffer module
30A initial buffer module
30N subsequent buffer module
30L last buffer module
31 first transfer conveyor
31E infeed conveyor track of buffer module
32 second transfer conveyor
32A outlet conveyor track of buffer module
33 front module
34 end module
35 sliding device
36 transfer device
37 outer guide
38 inner guide
39 mounting element
40 transfer means
41 arm
42 guardrail
43 adjusting element
44 upper redirection
45 lower redirection
46 track guardrail
47 support rail
47L lug of support rail
48 drive axle
49 adjusting element
51 first drive mechanism; drive
52 second drive mechanism; drive
53 third drive mechanism; drive
54 fourth drive mechanism; drive
55 fifth drive mechanism; drive 56 sixth drive mechanism; drive
57 seventh drive mechanism; drive
60 axle
61 axle
62 axle
63 axle
64 disc
65 Disc
66 disc
67 axle
68 drive wheel
70 upper side
71 bottom side
73 frame portion
74 lug
75 bore
76 bore
78 guide axle
79 roller
80 deflection roller
81 cover
82 screw
83 nut
84 mounting element
85 seat
86 side guidance
90 extension
92 TAB-guidances
100 container handling unit
105 control unit
110 first container handling unit
120 second container handling unit
130 floor space
360 post
363 track
A distance between two buffer modules
B width of buffer module
D chain height
E plane
I inner area
M intermediate module
ML module length
TR1 first transport direction
TR2 second transport direction
V vertical direction
X X-coordinate direction
Y Y-coordinate direction

What is claimed is:

1. A buffer means for containers operating according to the first in-first out principle, comprising:
   at least one infeed conveyor track drivable along an infeed direction;
   at least one outlet conveyor track drivable along an outlet direction;
   a buffer module formed by the at least one infeed conveyor track and the at least one outlet conveyor track which are arranged parallel to each other and having a width;
   a first edge, at the infeed conveyor track of the buffer module for the containers;
   a second edge, at the outlet conveyor track for the containers;
   a transfer device with an outer guide, so that the containers are transferrable from the infeed conveyor track to the outlet conveyor track of the buffer module;
   a sliding device for sliding the transfer device in parallel along the infeed conveyor track or the outlet conveyor track, respectively, in dependence on a required buffer capacity in the buffer means;
   at least one further drivable transfer conveyor arranged between the infeed conveyor track and the outlet conveyor track of the buffer module in such a way that it is parallel to the buffer module; and,
   a drive mechanism for the at least one further drivable transfer conveyor for a first transport direction or a second transport direction, wherein each drivable transfer conveyor and the sliding device has its own drive mechanism so that an individually controllable driving of the drivable transfer conveyors and of the sliding device is assured.

2. The buffer means according to claim 1, wherein at least two buffer modules are arranged parallel to each other and in a plane, wherein one transfer means is provided between the two parallel buffer modules, so that the containers are transferrable from the outlet conveyor track of an initial buffer module to the infeed conveyor track of a subsequent buffer module.

3. The buffer means according to claim 2, wherein the at least two buffer modules are arranged parallel and at a distance to each other.

4. The buffer means according to claim 3, wherein a cover is inserted into the distance between the at least two parallel buffer modules.

5. The buffer means according to claim 3, wherein into the distance between the at least two parallel buffer modules there is inserted at least one conveyor track, which is drivable along the infeed direction, in order to transport toppled-over containers out of the buffer means.

6. The buffer means according to claim 1, wherein the buffer means has a front module, an end module and at least one intermediate module.

7. The buffer means according to claim 1, wherein a length of the buffer means is formed by at least one individual intermediate module of constant module length.

8. The buffer means according to claim 2, wherein one transfer means is provided between two parallel buffer modules arranged and one after the other, having an endless chain with an upper redirection and a lower redirection at the front module, which are arranged in such a way in the buffer means that the endless chain forms the outlet conveyor track of the initial buffer module and the infeed conveyor track of a following buffer module.

9. The buffer means according to claim 1, wherein the buffer means is formed by three buffer modules.

10. The buffer means according to claim 9, wherein one transfer means is arranged between two parallel buffer modules, wherein the transfer means has an endless chain with an upper redirection and a lower redirection provided at a front module, which is arranged in such a way in the buffer means that the endless chain forms the outlet conveyor track of an initial buffer module and the infeed conveyor track of at least one subsequent intermediate buffer module and that the outlet conveyor track of at least one subsequent intermediate buffer module forms the infeed conveyor track of a last buffer module.

11. The buffer means according to claim 2, wherein a sliding device is provided within the plane formed by the at least two buffer modules, onto which there is mounted a louver band, and on which the at least one transfer device is located.

12. The buffer means according to claim 11, wherein the louver band is respectively provided between the infeed conveyor track and the outlet conveyor track of a buffer module.

13. The buffer means according to claim 12, wherein the louver band is arranged centrally in the individual buffer modules.

14. The buffer means according to claim 13, wherein the louver band exhibits a lateral guide for the neighboring conveyor tracks.

15. A method for buffering containers according to the first in-first out principle, comprising the steps:
supplying containers from a first container handling unit to an infeed conveyor track of a buffer means;
transferring the containers by means of a transfer device, which exhibits an inner guide and/or an outer guide, from the infeed conveyor track to an outlet conveyor track of the buffer means, wherein during transfer from the infeed conveyor track to the outlet conveyor track the containers are conducted via at least one further drivable transfer conveyor, which is arranged parallel to and between the infeed conveyor track and the outlet conveyor track essentially along an entire length of the buffer module;
determining a required buffer capacity by means of a control unit of the container handling apparatus;
moving a sliding device together with the transfer device in parallel along the infeed conveyor track and the outlet conveyor track, respectively, in dependence on the required buffer capacity; and,
driving the at least one further drivable transfer conveyor in a first transport direction or a second transport direction by a drive mechanism, wherein each drivable transfer conveyor and the sliding device has its own drive mechanism so that the drivable transfer conveyors and the sliding device are individually controllable.

16. A buffer means for containers operating according to the first in-first out principle, comprising:
at least one infeed conveyor track drivable along an infeed direction;
at least one outlet conveyor track drivable along an outlet direction;
three buffer modules, which are arranged parallel to each other; wherein each buffer module is formed by the at least one infeed conveyor track and the at least one outlet conveyor track which are arranged parallel to each other and having a width;
a first edge, at the infeed conveyor track of the buffer module for the containers;
a second edge, at the outlet conveyor track for the containers;
a transfer device with an outer guide, so that the containers are transferrable from the infeed conveyor track to the outlet conveyor track of the buffer module;
a sliding device for sliding the transfer device in parallel along the infeed conveyor track or the outlet conveyor track, respectively, in dependence on a required buffer capacity in the buffer means;
at least one further drivable transfer conveyor arranged between the infeed conveyor track and the outlet conveyor track of the buffer module in such a way that it is parallel to the buffer module;
a transfer means is arranged between an initial buffer module and a subsequent intermediate buffer module, a transfer between the intermediate buffer module and a last buffer module, wherein the initial buffer module, the intermediate buffer module and the last buffer module are arranged parallel to each other and the transfer means has an endless chain with an upper redirection and a lower redirection provided at a front module, which is arranged in such a way in the buffer means that the endless chain forms the outlet conveyor track of the initial buffer module and the infeed conveyor track of the intermediate buffer module and that the outlet conveyor track of the intermediate buffer module forms the infeed conveyor track of the last buffer module; and,
a drive mechanism for the at least one further drivable transfer conveyor for a first transport direction or a second transport direction, wherein each drivable transfer conveyor and the sliding device has its own drive mechanism so that an individually controllable driving of the drivable transfer conveyors and of the sliding device is assured.

17. The buffer means according to claim 16, wherein a sliding device is provided within a plane formed by the initial buffer module, the intermediate buffer module and the last buffer module and on the sliding device is mounted a louver band, and on which the at least one transfer device is located.

18. The buffer means according to claim 17, wherein the louver band is provided between the infeed conveyor track and the outlet conveyor track of each buffer module.

19. The buffer means according to claim 18, wherein the louver band is arranged centrally in the individual buffer modules.

20. The buffer means according to claim 19, wherein the louver band exhibits a lateral guide for the neighboring conveyor tracks.

21. A buffer means for containers operating according to the first in-first out principle, comprising:
at least one infeed conveyor track drivable along an infeed direction;
at least one outlet conveyor track drivable along an outlet direction;
a buffer module, having a front module, intermediate module or an end module, is formed by the at least one infeed conveyor track and the at least one outlet conveyor track which are arranged parallel to each other and having a width, wherein a plurality of front modules and end modules are arranged parallel to each other;
at least one intermediate module is arranged between the front module and the end module;
a sliding device for sliding a transfer device in parallel along the infeed conveyor track or the outlet conveyor track, respectively, in dependence on a required buffer capacity in the buffer means;
at least one further drivable transfer conveyor arranged between the infeed conveyor track and the outlet conveyor track of the buffer module;
a drive mechanism for the at least one further drivable transfer conveyor for a first transport direction or a second transport direction; and,
a drive mechanism for the sliding device;
wherein each drivable transfer conveyor and the sliding device has its own drive mechanism so that the drivable transfer conveyors and the sliding device are individually controllable.

22. The buffer means according to claim 21, wherein the transfer device with an outer guide is provided, so that the containers are transferrable from the infeed conveyor track to the outlet conveyor track of the respective buffer module.

23. The buffer means according to claim 21, wherein at least one further drivable transfer conveyor is arranged between the infeed conveyor track and the outlet conveyor track of the buffer modules in such a way that it is parallel to the buffer module.

24. The buffer means according to claim 21, wherein the front module, the intermediate module and the end module has three buffer modules arranged parallel and at a distance to each other.

25. A buffer means for containers operating according to the first in-first out principle, comprising:
- at least one infeed conveyor track drivable along an infeed direction;
- at least one outlet conveyor track drivable along an outlet direction;
- a buffer module formed by the at least one infeed conveyor track and the at least one outlet conveyor track which are arranged parallel to each other and having a width, wherein the buffer means has at least a front module and an end module;
- at least one intermediate module is arranged in a transport direction between the front module and the end module;
- a sliding device for sliding a transfer device in parallel along the infeed conveyor track or the outlet conveyor track, respectively, in dependence on a required buffer capacity in the buffer means;
- at least one further drivable transfer conveyor arranged between the infeed conveyor track and the outlet conveyor track of the buffer module;
- a drive mechanism for the at least one further drivable transfer conveyor for a first transport direction or a second transport direction; and,
- a drive mechanism for the sliding device;
- wherein each drivable transfer conveyor and the sliding device has its own drive mechanism so that the drivable transfer conveyors and the sliding device are individually controllable.

26. The buffer means according to claim 25, wherein the transfer device is provided with an outer guide, so that the containers are transferrable from the infeed conveyor track to the outlet conveyor track of the buffer module.

27. The buffer means according to claim 25, wherein a plurality of buffer modules are arranged parallel to each other, each having a front module and an end module and at least one intermediate module arranged in the transport direction between the front module and the end module of each buffer module.

28. The buffer means according to claim 25, wherein three buffer modules are arranged parallel to each other and at least two intermediate buffer modules are arranged in the transport direction between the front module and the end module of each buffer module.

29. The buffer means according to claim 25, wherein the at least one further drivable transfer conveyor is arranged between the infeed conveyor track and the outlet conveyor track of the buffer module in such a way that it is parallel to the buffer module.

30. A buffer means for containers operating according to the first in-first out principle, comprising:
- at least one infeed conveyor track drivable along an infeed direction;
- at least one outlet conveyor track drivable along an outlet direction;
- a buffer module formed by the at least one infeed conveyor track and the at least one outlet conveyor track which are arranged parallel to each other and having a width;
- a transfer device with an inner guide and an outer guide, so that the containers are transferrable from the infeed conveyor track to the outlet conveyor track of the buffer module, wherein a position of the outer guide of each transfer device is adjustable so that a width of a track is changed;
- a sliding device for sliding the transfer device parallel along the infeed conveyor track or the outlet conveyor track, respectively, in dependence on a required buffer capacity in the buffer means;
- at least one further drivable transfer conveyor arranged between the infeed conveyor track and the outlet conveyor track of the buffer module;
- a drive mechanism for the at least one further drivable transfer conveyor for a first transport direction or a second transport direction; and,
- a drive mechanism for the sliding device;
- wherein each drivable transfer conveyor and the sliding device has its own drive mechanism so that the drivable transfer conveyors and the sliding device are individually controllable.

31. The buffer means according to claim 30, wherein the inner guide and the outer guide hang from a plurality of arms and the arms carry adjusting elements through which the width of the track or the position of the outer guide, respectively, are changed.

32. A buffer means for containers operating according to the first in-first out principle, comprising:
- at least one infeed conveyor track drivable along an infeed direction;
- at least one outlet conveyor track drivable along an outlet direction;
- two buffer modules formed by the at least one infeed conveyor track and the at least one outlet conveyor track which are arranged parallel and at a distance to each other, wherein the two buffer modules are arranged parallel to each other;
- a discharge conveyor track for toppled over containers is arranged between the two buffer modules, wherein the toppled over containers are transported to an end of the buffer means, wherein the discharge conveyor track provides for a lateral guidance of the neighboring transfer conveyors;
- a transfer device with an outer guide, so that the containers are transferrable from the infeed conveyor track to the outlet conveyor track of the buffer module;
- a sliding device for sliding the transfer device parallel along the infeed conveyor track or the outlet conveyor track, respectively, in dependence on a required buffer capacity in the buffer means;
- at least one further drivable transfer conveyor arranged between the infeed conveyor track and the outlet conveyor track of the buffer module;
- a drive mechanism for the at least one further drivable transfer conveyor for a first transport direction or a second transport direction; and,
- a drive mechanism for the sliding device;
- wherein each drivable transfer conveyor and the sliding device has its own drive mechanism so that the drivable transfer conveyors and the sliding device are individually controllable.

33. A buffer means for containers operating according to the first in-first out principle, comprising:
- at least one infeed conveyor track drivable along an infeed direction;
- at least one outlet conveyor track drivable along an outlet direction;
- a buffer module formed by the at least one infeed conveyor track and the at least one outlet conveyor track which are arranged parallel and wherein the infeed conveyor track, the outlet conveyor track and a cover or a discharge conveyor track of the buffer module are arranged so that a closed surface or plane, respectively, is formed;

a transfer device with an inner guide and an outer guide, so that the containers are transferrable from the infeed conveyor track to the outlet conveyor track of the buffer module;

a sliding device for sliding the transfer device parallel along the infeed conveyor track or the outlet conveyor track, respectively, in dependence on a required buffer capacity in the buffer means;

at least one further drivable transfer conveyor arranged between the infeed conveyor track and the outlet conveyor track of the buffer module;

a drive mechanism for the at least one further drivable transfer conveyor for a first transport direction or a second transport direction; and, a drive mechanism for the sliding device;

wherein each drivable transfer conveyor and the sliding device has its own drive mechanism so that the drivable transfer conveyors and the sliding device are individually controllable.

34. The buffer means according to claim 33, wherein a plurality of buffer modules are arranged parallel to each other each having an infeed conveyor track and an outlet conveyor track, wherein the cover or the discharge conveyor tracks are arranged between the infeed conveyor track and the outlet conveyor track so that all conveyor tracks and the cover form a closed surface or plane across the entire buffer means.

35. A buffer means for containers operating according to the first in-first out principle, comprising:

at least one infeed conveyor track drivable along an infeed direction;

at least one outlet conveyor track drivable along an outlet direction;

an endless transfer chain arranged between the infeed conveyor track and the outlet conveyor track;

a louver band arranged between the endless transfer chain, wherein a sliding device is connected to the louver band on either side; and, at least one support rail, wherein the louver band and the endless transfer chain are guided and supported by one support rail.

36. A buffer means for containers operating according to the first in-first out principle, comprising:

at least one infeed conveyor track drivable along an infeed direction;

aleast one outlet conveyor track drivable along an outlet direction;

an endless transfer chain arranged between the infeed conveyor track and the outlet conveyor track;

a sliding device mounted to a louver band which is arranged between the endless transfer chain; and, deflection pulleys are provided in the vicinity of the sliding device for guiding the transfer chain on an inner side by engaging at least TAB-guidances of the endless transfer chain, for securing the endless transfer chain against a lateral rising in horizontal deflections.

37. The buffer means according to claim 36, wherein the endless transfer chain exhibits a TAB-guidance on the side facing support rails wherein the TAB-guidance is guided by the support rail shared by the outlet conveyor track, the endless transfer chain, and the infeed conveyor track with the endless transfer chain.

* * * * *